(12) United States Patent
Nomura

(10) Patent No.: US 6,853,126 B2
(45) Date of Patent: Feb. 8, 2005

(54) ELECTRON-EMITTING DEVICE, ELECTRON SOURCE, IMAGE FORMING APPARATUS, AND ELECTRON-EMITTING APPARATUS

(75) Inventor: Kazushi Nomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/955,137

(22) Filed: Sep. 19, 2001

(65) Prior Publication Data

US 2002/0047513 A1 Apr. 25, 2002

(30) Foreign Application Priority Data

Sep. 22, 2000 (JP) ........................................ 2000-289184
Sep. 12, 2001 (JP) ........................................ 2001-277158

(51) Int. Cl.$^7$ .............................. H01J 1/62; H01J 63/04; H01J 1/46
(52) U.S. Cl. ....................... 313/492; 313/495; 313/350; 313/346 R
(58) Field of Search ................................. 313/336, 351, 313/350, 309–311, 495, 346 R, 496; 315/169.1, 169.4, 169.3; 445/24, 25, 50, 51

(56) References Cited

U.S. PATENT DOCUMENTS

| 4,728,851 A | 3/1988 | Lambe ........................ 313/309 |
| 4,816,289 A | 3/1989 | Komatsu et al. .......... 423/447.3 |
| 4,900,483 A | 2/1990 | Witzke et al. ............... 313/309 |
| 4,904,895 A | 2/1990 | Tsukamoto et al. .......... 313/336 |
| 4,956,578 A * | 9/1990 | Shimizu et al. ................. 315/3 |
| 5,066,883 A | 11/1991 | Yoshioka et al. ............ 313/309 |
| 5,185,554 A * | 2/1993 | Nomura et al. .............. 313/495 |
| 5,192,240 A | 3/1993 | Komatsu ...................... 445/24 |
| 5,214,346 A | 5/1993 | Komatsu ..................... 313/309 |
| 5,382,867 A | 1/1995 | Yuji et al. ................... 313/309 |
| 5,443,859 A | 8/1995 | Nagata ........................ 427/122 |
| 5,458,784 A | 10/1995 | Baker et al. ................. 210/674 |
| 5,500,200 A | 3/1996 | Mandeville et al. ...... 423/447.3 |
| 5,543,684 A * | 8/1996 | Kumar et al. ................ 313/495 |
| 5,551,903 A | 9/1996 | Kumar et al. ................... 445/24 |
| 5,577,943 A | 11/1996 | Vickers et al. ................. 445/24 |
| 5,612,587 A | 3/1997 | Itoh et al. .................... 313/309 |
| 5,618,875 A | 4/1997 | Baker et al. ................. 524/495 |
| 5,690,997 A | 11/1997 | Grow ....................... 427/249.1 |

(List continued on next page.)

FOREIGN PATENT DOCUMENTS

| CN | 1181607 A | 5/1998 |
| EP | 0 290 026 | 11/1988 |

(List continued on next page.)

OTHER PUBLICATIONS

W.P. Dyke et al., "Field Emission", *Advances in Electronics and Electron Physics*, vol. 8, (1956) pp. 89–185.

(List continued on next page.)

*Primary Examiner*—Joseph Williams
*Assistant Examiner*—Peter Macchiarolo
(74) *Attorney, Agent, or Firm*—Fitzpatrick, Cella, Harper & Scinto

(57) ABSTRACT

Disclosed is an electron-emitting device, an electron source, and an image-forming apparatus that have uniform electron-emitting characteristics, emit electron beams whose diameters are small, have simple constructions, and are easy to be manufactured. The electron-emitting device comprising: a first electrode arranged on a surface of a substrate; an insulating layer arranged on the first electrode; a second electrode arranged on the insulating layer; and an electron-emitting film arranged on the second electrode, where the second electrode has two side surfaces that oppose each other in a direction parallel to the surface of the substrate, and the electron-emitting film is arranged so as to be shifted toward one of the two side surfaces.

30 Claims, 20 Drawing Sheets

U.S. PATENT DOCUMENTS

| | | | | |
|---|---|---|---|---|
| 5,726,524 | A | | 3/1998 | Debe .................... 313/309 |
| 5,770,918 | A | * | 6/1998 | Kawate et al. ............ 313/495 |
| 5,773,921 | A | | 6/1998 | Keesmann et al. ......... 313/309 |
| 5,847,495 | A | | 12/1998 | Yamanobe et al. ......... 313/310 |
| 5,872,422 | A | | 2/1999 | Xu et al. .................. 313/311 |
| 5,872,541 | A | * | 2/1999 | Yoshioka et al. .......... 345/74.1 |
| 5,935,639 | A | | 8/1999 | Sullivan et al. ............ 427/78 |
| 5,965,267 | A | | 10/1999 | Nolan et al. ............... 428/408 |
| 5,973,444 | A | * | 10/1999 | Xu et al. .................. 313/309 |
| 5,981,305 | A | | 11/1999 | Hattori .................... 438/20 |
| 5,982,091 | A | | 11/1999 | Konishi .................... 313/495 |
| 5,986,389 | A | | 11/1999 | Tsukamoto ................. 313/310 |
| 6,087,765 | A | | 7/2000 | Coll et al. ................. 313/309 |
| 6,097,138 | A | | 8/2000 | Nakamoto ................. 313/309 |
| 6,129,602 | A | | 10/2000 | Yamanobe ................. 445/24 |
| 6,135,839 | A | * | 10/2000 | Iwase et al. ............... 445/24 |
| 6,147,449 | A | | 11/2000 | Iwasaki et al. ............. 313/495 |
| 6,171,162 | B1 | | 1/2001 | Iwasaki et al. ............. 445/6 |
| 6,184,610 | B1 | | 2/2001 | Shibata et al. ............. 313/309 |
| 6,204,597 | B1 | | 3/2001 | Xie et al. .................. 313/310 |
| 6,228,904 | B1 | | 5/2001 | Yadav et al. ............... 523/210 |
| 6,231,413 | B1 | | 5/2001 | Tsukamoto ................. 445/24 |
| 6,246,168 | B1 | | 6/2001 | Kishi et al. ............... 313/495 |
| 6,274,881 | B1 | * | 8/2001 | Akiyama et al. ........... 313/309 |
| 6,283,812 | B1 | | 9/2001 | Jin et al. .................. 445/24 |
| 6,283,815 | B1 | | 9/2001 | Iwasaki et al. ............. 445/41 |
| 6,288,494 | B1 | | 9/2001 | Tsukamoto et al. ......... 315/169.1 |
| 6,290,564 | B1 | | 9/2001 | Talin et al. ............... 445/50 |
| 6,313,572 | B1 | | 11/2001 | Yamada .................... 313/310 |
| 6,331,690 | B1 | | 12/2001 | Yudasaka et al. .......... 219/121.6 |
| 6,333,016 | B1 | | 12/2001 | Resasco et al. ............ 423/447.3 |
| 6,390,612 | B1 | | 5/2002 | Kotaki et al. .............. 347/85 |
| 6,400,091 | B1 | * | 6/2002 | Deguchi et al. ............ 315/169.1 |
| 6,413,487 | B1 | | 7/2002 | Resasco et al. ............ 423/447.3 |
| 6,435,928 | B1 | | 8/2002 | Tsukamoto ................. 445/24 |
| 6,445,006 | B1 | | 9/2002 | Brandes et al. ............. 257/76 |
| 6,448,709 | B1 | | 9/2002 | Chuang et al. ............. 313/495 |
| 6,455,021 | B1 | | 9/2002 | Saito ....................... 423/447.3 |
| 6,471,936 | B1 | | 10/2002 | Chen et al. ............... 423/658.2 |
| 6,472,814 | B1 | | 10/2002 | Yamanobe et al. ......... 313/495 |
| 6,512,329 | B1 | | 1/2003 | Mitsutake et al. .......... 313/495 |
| 6,517,399 | B1 | | 2/2003 | Ito et al. .................. 445/24 |
| 6,541,906 | B2 | | 4/2003 | Lee et al. ................. 313/495 |
| 6,605,894 | B2 | | 8/2003 | Choi et al. ................ 313/495 |
| 6,624,589 | B2 | | 9/2003 | Kitamura et al. ........... 315/169.3 |
| 6,626,719 | B2 | | 9/2003 | Ono et al. ................. 445/24 |
| 6,628,053 | B1 | | 9/2003 | Den et al. ................. 313/310 |
| 2001/0006232 | A1 | | 7/2001 | Choi et al. ................ 257/10 |
| 2002/0009637 | A1 | | 1/2002 | Murakami et al. .......... 429/213 |
| 2002/0031972 | A1 | | 3/2002 | Kitamura et al. ........... 445/3 |
| 2002/0136896 | A1 | | 9/2002 | Takikawa et al. ........... 428/408 |
| 2003/0006684 | A1 | | 1/2003 | Kawate et al. ............ 313/311 |
| 2003/0048055 | A1 | | 3/2003 | Ishikura et al. ............ 313/311 |
| 2003/0048056 | A1 | | 3/2003 | Kitamura et al. ........... 313/311 |
| 2003/0057860 | A1 | | 3/2003 | Tsukamoto ................. 315/169.3 |
| 2003/0222560 | A1 | | 12/2003 | Roach ..................... 313/311 |

FOREIGN PATENT DOCUMENTS

| | | | |
|---|---|---|---|
| EP | 0 394 698 | 10/1990 | |
| EP | 0 433 507 A1 | 6/1991 | ........... D01F/9/127 |
| EP | 0 443 865 A1 | 8/1991 | |
| EP | 0 290 026 B1 | 2/1993 | ............ H01J/3/02 |
| EP | 0 535 953 A2 | 4/1993 | |
| EP | 0 614 209 A1 | 7/1994 | |
| EP | 0 535 953 B1 | 1/1996 | ............ H01J/1/30 |
| EP | 0 716 439 A1 | 6/1996 | |
| EP | 0 758 028 A2 | 2/1997 | |
| EP | 0 797 233 A2 | 9/1997 | |
| EP | 0 836 217 A1 | 4/1998 | ............ H01J/29/94 |
| EP | 0 871 195 A1 | 10/1998 | |
| EP | 0 913 508 A3 | 5/1999 | |
| EP | 0 913 508 A2 | 5/1999 | |
| EP | 0 936 650 A1 | 8/1999 | |
| EP | 0 980 089 A1 | 2/2000 | |
| EP | 0 451 208 B1 | 3/2000 | ............ D01F/9/12 |
| EP | 0 986 084 A2 | 3/2000 | |
| EP | 1 022 763 A1 | 7/2000 | ............ H01J/9/02 |
| EP | 1 113 478 A1 | 4/2001 | |
| EP | 1 096 533 A1 | 5/2001 | ............ H01J/9/02 |
| EP | 1 102 299 A1 | 5/2001 | ............ H01J/1/30 |
| EP | 1 117 118 A1 | 7/2001 | |
| EP | 1 120 877 A1 | 8/2001 | ............ H02G/5/06 |
| EP | 1 122 344 A3 | 8/2001 | |
| EP | 1 122 344 A2 | 8/2001 | ............ D01F/9/127 |
| EP | 1 187 161 A2 | 3/2002 | ............ H01J/3/02 |
| EP | 0 758 028 B1 | 9/2002 | ............ D01F/9/127 |
| GB | 2 308 495 A | 6/1997 | ............ H01J/1/20 |
| JP | 1-309242 | 12/1989 | ............ H01J/37/06 |
| JP | 2-112125 | 4/1990 | |
| JP | 3-20941 | 1/1991 | |
| JP | 03-260119 | 11/1991 | ............ D01F/9/127 |
| JP | 3-295131 | 12/1991 | |
| JP | 4-212236 | 8/1992 | |
| JP | 05-152640 | 6/1993 | ............ H01L/49/00 |
| JP | 5-159696 | 6/1993 | |
| JP | 5-198253 | 8/1993 | |
| JP | 5-211029 | 8/1993 | |
| JP | 05-211029 | 8/1993 | ............ H01J/1/30 |
| JP | 5-274997 | 10/1993 | |
| JP | 7-6714 | 10/1995 | |
| JP | 8-115652 | 5/1996 | |
| JP | 08-115652 | 5/1996 | ............ H01J/1/30 |
| JP | 08-264107 | 10/1996 | ............ H01J/1/30 |
| JP | 8-264109 | 10/1996 | |
| JP | 8-298068 | 11/1996 | ............ H01J/1/30 |
| JP | 9-82214 | 3/1997 | |
| JP | 9-188600 | 7/1997 | |
| JP | 10-149760 | 6/1998 | ............ H01J/1/30 |
| JP | 10-199398 | 7/1998 | ............ H01J/1/30 |
| JP | 10-289650 | 10/1998 | |
| JP | 11-139815 | 5/1999 | ............ C01B/31/02 |
| JP | 11-162334 | 6/1999 | ............ H01J/9/02 |
| JP | 11-194134 | 7/1999 | ............ G01N/37/00 |
| JP | 11-232997 | 8/1999 | |
| JP | 2000-57934 | 2/2000 | ............ H01J/1/304 |
| JP | 2000-86216 | 3/2000 | ............ C01B/31/02 |
| JP | 2000-90809 | 3/2000 | ............ H01J/1/304 |
| JP | 2000-95509 | 4/2000 | ............ C01B/31/02 |
| JP | 2000-208028 | 7/2000 | ............ H01J/1/304 |
| JP | 2000-223005 | 8/2000 | ............ H01J/1/304 |
| JP | 2000-277003 | 10/2000 | |
| JP | 2001-52598 | 2/2001 | ............ H01J/1/316 |
| JP | 2001-162600 | 6/2001 | ............ B82B/1/00 |
| JP | 2001-288625 A | 10/2001 | ............ D01F/9/127 |
| KR | 1999-019614 | 3/1999 | ............ H01J/1/30 |
| WO | WO 89/07163 | 8/1989 | |
| WO | WO 90/07023 | 6/1990 | |
| WO | WO 98/05920 | 2/1998 | |
| WO | WO 99/58748 | 11/1999 | ............ D01F/9/127 |
| WO | WO 01/26130 | 4/2001 | ............ H01J/9/20 |
| WO | WO 01/93292 | 12/2001 | ............ H01J/1/304 |

OTHER PUBLICATIONS

C.A. Spindt et al., "Physical Properties of Thin–film Field Emission Cathodes with Molybdenum Cones", *Journal of Applied Physics*, vol. 47, No. 12 (1976), pp. 5248–5263.

C.A. Mead, "Operation of Tunnel–Emission Devices", *Journal of Applied Physics*, vol. 32, No. 4, (1961), pp. 646–652.

Toshiaki Kusunoki et al., "Fluctuation–Free Electron Emission from Non–Formed Metal–Insulator–Metal (MIM) Cathodes Fabricated by Low Current Anodic Oxidation", *Japanese Journal of Applied Physics,* vol. 32 No. 11B, (1993), p. L1695–1697.

M.I. Elinson et al., "The Emission of Hot Electrons and the Field Emission of Electrons from Tin Oxide", *Radio Engineering and Electronic Physics,* (1965) pp. 1290–1296.

G. Dittmer, "Electrical Conduction and Electron Emission of Discontinuous Thin Films", *Thin Solid Films,* vol. 9, (1972) pp. 317–329.

M. Hartwell et al., "Strong Electron Emission from Patterned Tin–Indium Oxide Thin Films", IEEE Trans. Ed. Conf., (1983) pp. 519–521.

Hisashi Araki et al., Electroforming and Electron Emission of Carbon Thin Films, Journal of the Vacuum Society of Japan, 1983 (with English Abstract on p. 22).

R.T.K. Baker et al., "Formation of Carbonaceous Deposits from the Platinum–Iron Catalyzed Decomposition of Acyetylene," 37 J. Catal. 101–105 (1975).

R.T.K. Baker, "Catalytic Growth of Carbon Filaments," 27 (3) Carbon 315–323 (1989).

S. Iijima, "Helical Microtubules of Graphitic Carbon," Nature, vol. 354, 56–58 (1991).

T. W. Ebbesen et al., "Large–Scale Synthesis of Carbon Nanotubes," Nature, vol. 358, 220–222 (1992).

W. A. DeHeer et al., "Aligned Carbon Nanotube Films: Production and Optical and Electronic Properties," Science, vol. 268, 845–847 (1995).

T. Guo et al., " Catalytic Growth of Single– Walled Nanotubes by Laser Vaporization," Chem Phys. Lett., vol. 243, 49–54 (1995).

A. G. Rinzler et al., "Unraveling Nanotubes: Field Emission from an Atomic Wire," Science, vol. 269, 1550–1553 (1995).

W. A. DeHeer et al., "A Carbon Nanotube Field–Emission Electron Source," Science, Vol. 270, 1179–1180 (1995).

T. Kyotani et al., "Preparation of Ultrafine Carbon Tubes in Nanochannels of an Anodic Aluminum Oxide Film," Chem. Mater., vol. 8, 2109–2113 (1996).

A. Thess et al., "Crystalline Ropes of Metallic Carbon Nanotubes," Science, vol. 273 483–487 (1996).

H. Dai et al., " Single–Wall Nanotubes Produced by Metal–Catalyzed Disproportionation of Carbon Monoxide," Chem. Phys. Lett., vol. 260, 471–475 (1996).

H. Dai et al., "Nanotubes as Nanoprobes in Scanning Probe Microscopy," Nature, vol. 384, 147–150 (1996).

A. C. Dillon et al., "Storage of Hydrogen in Single– Walled Carbon Nanotubes," Nature, vol. 386, 377–379 (1997).

Rodriguez et al. "Catalytic Engineering of Carbon Nanostructures," Langmuir 11, 3862–3866 (1995).

W. Zhu et al., *Electron Field Emission From Nanostructured Diamond and Carbon Nanotubes,* Solid State Electronics, vol. 45, 2001, pp. 921–928.

J.M. Bonard et al., *Field Emission From Carbon Nanotubes: The First Five Years,* Solid State Electronics, vol. 45, 2001, pp. 893–914.

A.M. Rao et al., "In Situ–grown Carbon Nanotube Array of with Excellent Field Emission Characteristics," Applied Physics Letter, vol. 76, No. 25, pp. 3813–3815 (2000).

Cheol Jin Lee et al., "Carbon Nanofibers Grown on Sodalime Glass at 500° C Using Thermal Chemical Vapor Deposition," Chemical Physics Letters 340, pp. 413–418 (2001).

Sashiro Uemura et al., "Carbon Nanotube FED with Graphite–Nano–Fiber Emitters," ISSN 1083–1312. pp. 398–401.

Q. H. Wang et al., "A Nanotube–Based Field–Emission Flat Panel Display," Applied Physics Letters, vol. 72, No. 22, Jun. 1998, pp. 2912–2913.

* cited by examiner

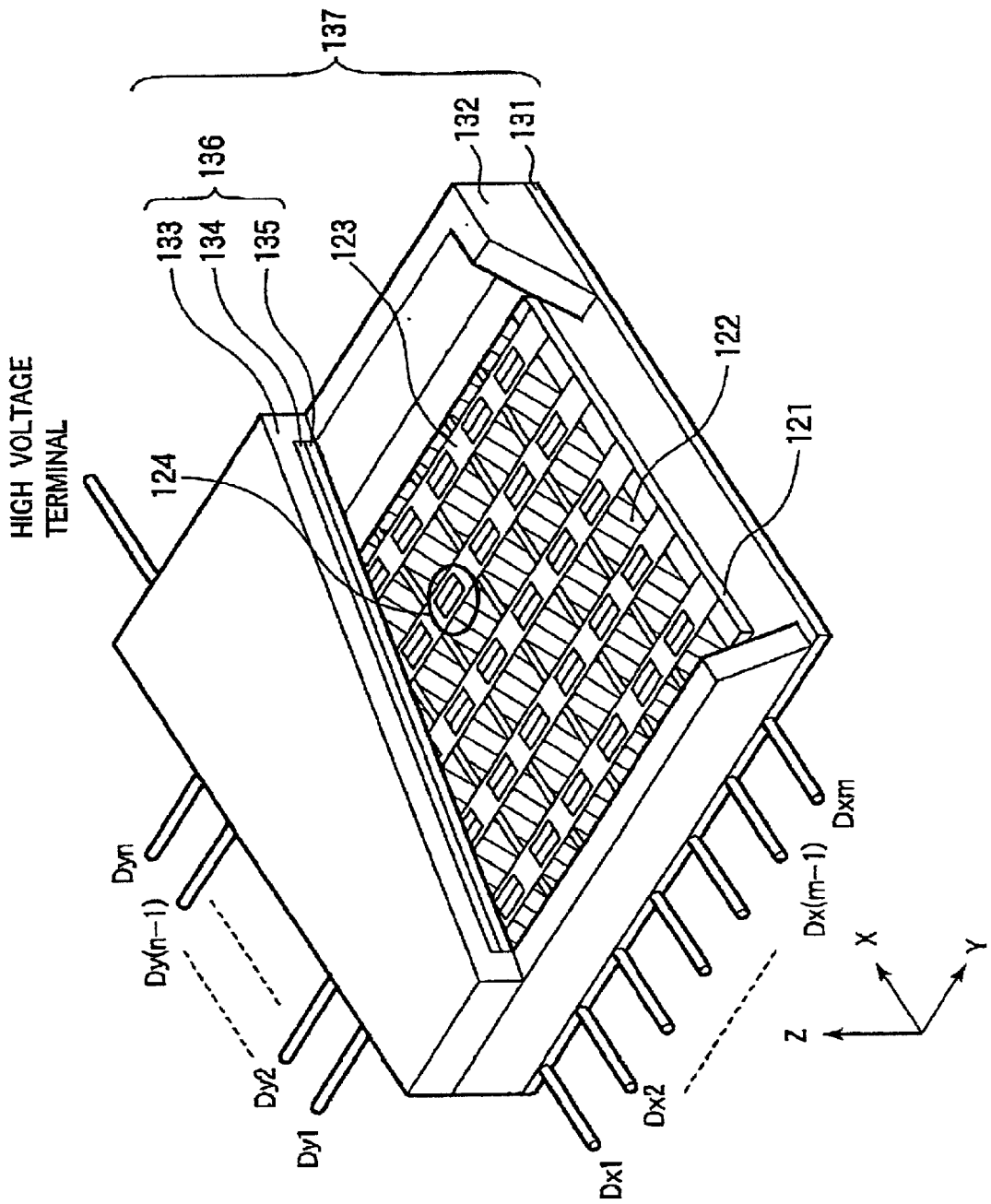

STRIPE

MATRIX

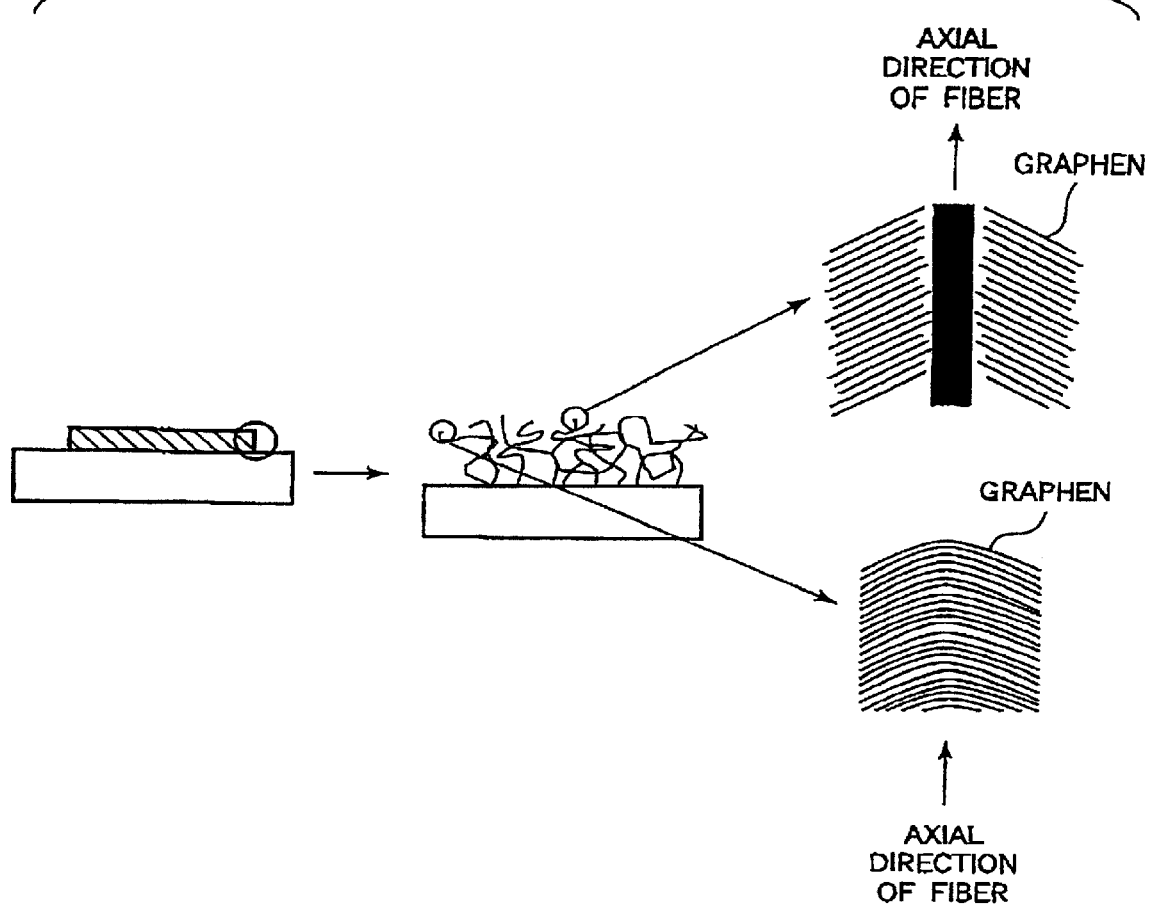

ELECTRON-EMITTING DEVICE, ELECTRON SOURCE, IMAGE FORMING APPARATUS, AND ELECTRON-EMITTING APPARATUS

BACKGROUND OF THE INVENTION

1. Field of the Invention

The present invention relates to an electron-emitting device, an electron-emitting apparatus using the electron-emitting device, an electron source in which a plurality of the electron-emitting devices are arranged, and an image-forming apparatus constructed using the electron source.

2. Related Background Art

There have been conventionally known two types of electron-emitting devices: thermionic cathode electron-emitting devices and cold cathode electron-emitting devices. The cold cathode electron-emitting devices include, in the category thereof, devices of electric field emitting type (hereinafter referred to as the "FE" type), devices of metal/insulating layer/metal type (hereinafter referred to as the "MIM" type), and surface conduction electron-emitting devices. The FE type electron-emitting devices include devices of diode type that extract electrons using anode electrodes and devices of edge emitter type that emit electrons from edge portions of emitters.

As the diode type electron-emitting devices, there has been known an device disclosed in U.S. Pat. No. 5,551,903.

As the edge emitter type electron-emitting devices, there have been known devices disclosed in Japanese Patent Application Laid-open No. 10-289650 and Japanese Patent Application Laid-open No. 8-298068.

SUMMARY OF THE INVENTION

In the case of the conventional techniques described above, there occur the following problems.

The application of electron-emitting devices to image-forming apparatuses, such as displays, needs enough emission current to have phosphor emit light having sufficient brightness. Also, to achieve high-definition displays, it is necessary that the diameter of electron beam applied onto phosphor are small and electron-emitting characteristics are uniform. Further, it is important that the electron-emitting devices are driven at low voltage and are easy to be manufactured.

FIG. 16 shows an example of the foregoing diode type electron-emitting devices among the FE-type electron-emitting devices.

The electron-emitting device in this example has a construction where a conductive material 302 is disposed on a substrate 301, a convex portion 304 made of a conductive material is formed on the conductive material 302, an electron-emitting film 305 is laminated on the top end of the convex portion 304, and electrons me extracted by an anode 306 disposed above these components. With this construction, however, the maximum electric field is applied to the end portion of the electron-emitting film 305, so that the beam diameter of emitted electrons tends to be increased.

Also, because electrons are extracted by the voltage applied to the anode 306, a large anode voltage is required in order to have a phosphor (not shown) arranged at the back of the anode 306 emit light having sufficient brightness. However, because the anode 306 doubles as a modulation voltage in this construction, it is difficult to apply a high voltage to the anode 306.

If a distance D2 between the anode 306 and the electron-emitting film 305 is reduced in view of these problems, the beam diameter of emitted electrons is decreased to some extent and the anode voltage required for electron emission is lowered. In this case, however, the energy of emitted electrons is also lowered and therefore it becomes difficult to have the phosphor emit light having sufficient brightness.

An example of the foregoing edge emitter type electron-emitting devices is shown in FIG. 17.

The electron-emitting device in this example has a construction where a cathode 312 is sandwiched between two gate electrodes 314, with insulating layers 313 being inserted between the cathode 312 and the gate electrodes 314. With this construction, the two gate electrodes 314 apply positive voltages ($0<|Vg1|\leq|Vg2|$) to the cathode 312, thereby increasing the amount of electrons emitted from the cathode 312. In this case, however, the beam diameter of emitted electrons tends to be increased.

The present invention has been made in the light of the above-mentioned problems of the conventional techniques, and an object of the present invention is to provide an electron-emitting device, an electron source, and an image-forming apparatus, which are driven at low voltage, have uniform electron-emitting characteristics, produce electron beams having small diameters, have simple constructions, and are easy to be manufactured.

The present invention which has been attained to solve the above-mentioned problems is given below:

That is, an electron-emitting apparatus of the present invention is characterized in that: the apparatus comprises: an electron-emitting device including a first electrode, a second electrode that is provided so as to be insulated from the first electrode, and an electron-emitting film connected to the second electrode; and an anode provided at a predetermined distance from the electron-emitting film; and that the first electrode, the second electrode, and the electron-emitting film oppose the anode; a distance between the anode and the electron-emitting film is longer than a distance between the anode and the second electrode; and a distance between the anode and the first electrode is longer than the distance between the anode and the electron-emitting film.

Further, the electron-emitting device of the present invention is characterized in that: the device comprises: a first electrode arranged on a surface of a substrate, an insulating layer arranged on the first electrode, a second electrode arranged on the insulating layer, and an electron-emitting film arranged on the second electrode, and that the second electrode has two side surfaces that oppose each other in a direction parallel to the surface of the substrate; and the electron-emitting film is arranged so as to be shifted toward one of the two side surfaces.

An electron source is formed by arranging a plurality of the above electron-emitting devices, and is characterized in that the electron source emits electrons using at least one of the plurality of electron-emitting devices according to an input signal.

An image-forming apparatus is characterized by comprising the above electron source, and an image forming member on which an image is formed by irradiation with electrons emitted from the electron source.

With employment of the electron-emitting device according to the present invention, an electron beam, which is driven at a low voltage; is easy to produce; and has a small beam diameter, can be obtained, and in addition an electron source and an image-forming apparatus, which have uniform electron-emitting characteristics with high definition, and are stable for a long time period, can be realized.

BRIEF DESCRIPTION OF THE DRAWINGS

FIG. 7 is a schematic view showing the construction of an image-forming apparatus that uses the electron source having the passive matrix configuration according to the embodiment of the present invention;

FIG. 20 is a schematic diagram illustrating another construction of the fiber whose main ingredient is carbon.

DETAILED DESCRIPTION OF THE PREFERRED EMBODIMENTS

The preferred embodiment of the present invention will be exemplarily described in detail below with reference to the drawings. Note that the sizes, materials, shapes, relative positions, and other aspects of components described below should be appropriately changed according to the construction and various conditions of an apparatus to which the present invention is applied. Therefore, there is no intention to limit the scope of the present invention to the following description.

An electron-emitting device to which the present invention is applied has a characteristic that a first electrode, an electron-emitting film, and a second electrode oppose an anode, a step is formed between a surface of the first anode and a surface of the electron-emitting film opposing the anode, another step is formed between the surface of the electron-emitting film opposing the anode and a surface of the second electrode opposing the anode, a distance from the surface of the first electrode opposing the anode to the anode is longer than that from the surface of the electron-emitting film opposing the anode to the anode, and a distance from the surface of the electron-emitting film opposing the anode to the anode is longer than that from the surface of the second electrode opposing the anode to the anode. That is, the electron-emitting device is characterized in that it has a step-like construction.

As is apparent from this, the electron-emitting device to which the present invention is applied can be constructed merely by laminating the components. This means that the electron-emitting device is easy to be manufactured and the construction thereof is easy to be controlled. As a result, the uniformity of the electron-emitting characteristic of the electron-emitting device is increased.

Also, the electron-emitting device to which the present invention is applied is characterized in that it is a triode device where the emission of electrons from the electron-emitting film is caused by the anode to which a given voltage is applied and the emitted electrons are controlled by the first electrode functioning as a modulation electrode.

In the electron-emitting device to which the present invention is applied, the first electrode on the substrate functions as a modulation electrode. This makes it possible to apply a high voltage to the anode, so that emitted electrons strike a phosphor with energy that is enough to have the phosphor emit light. As a result, light having sufficient brightness is emitted from the phosphor.

Also, by applying a voltage, which is lower than that applied to the electron-emitting film, to the electrode used as a modulation electrode, the strength of an electric field applied to an electron-emitting region of the electron-emitting film can be decreased without difficulty. This makes it possible to drive the electron-emitting device, to which the present invention is applied, at low voltage.

Figure 1:
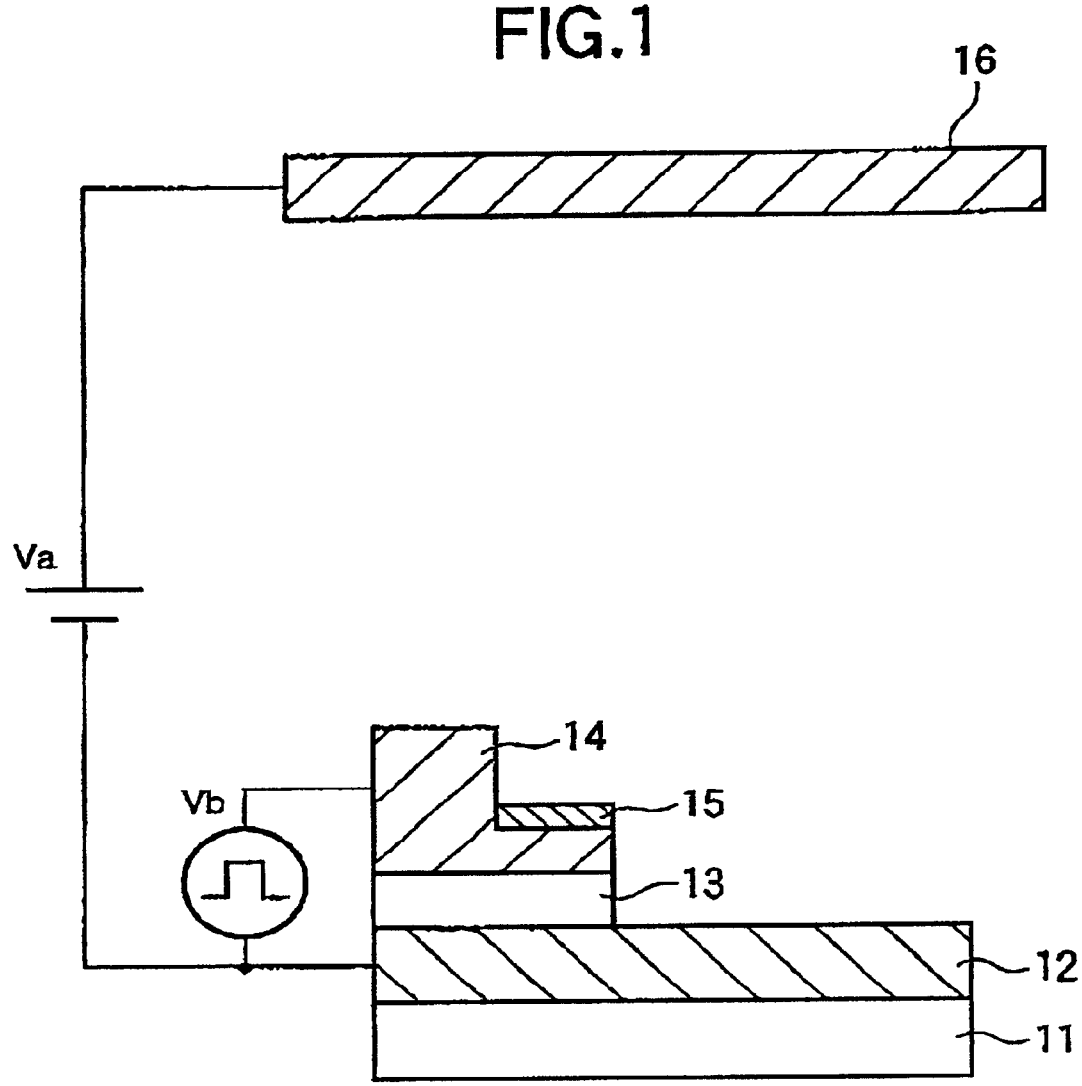
FIG. 1 is a schematic cross-sectional view showing the construction of an electron-emitting device to which the present invention is applied.
Figure 2:
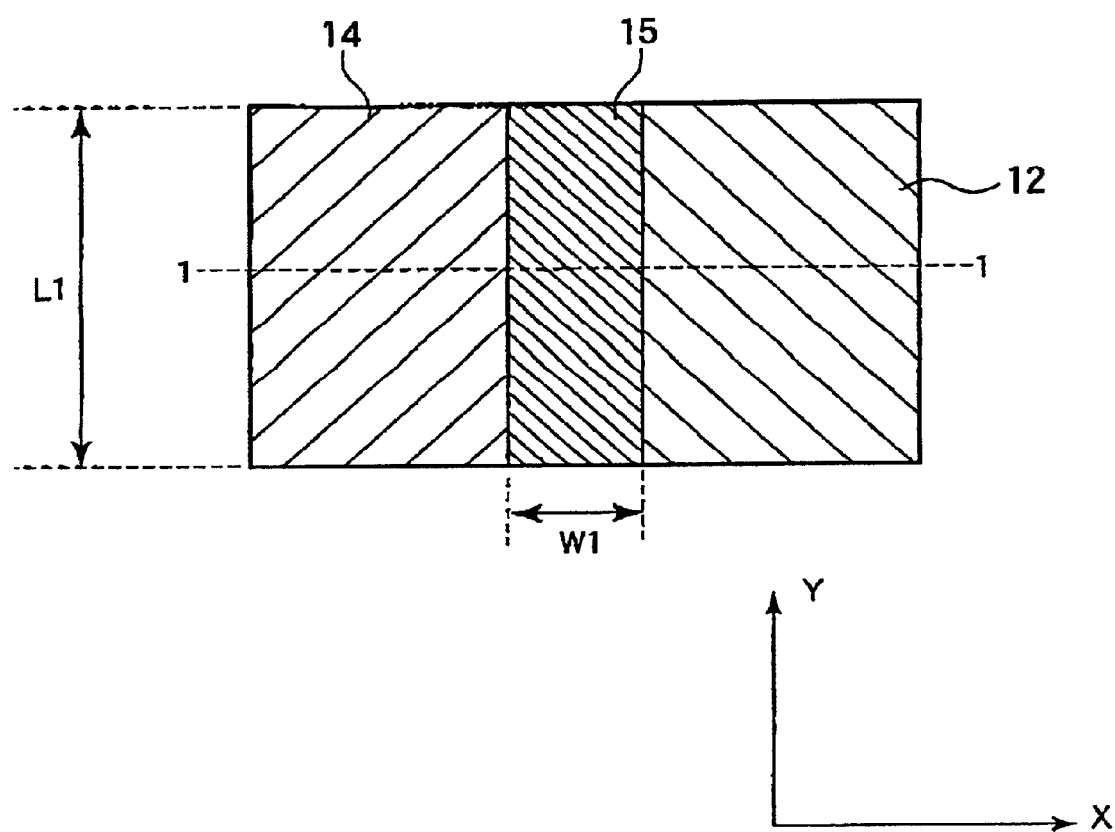
FIG. 2 is a schematic plain view showing the construction of the electron-emitting device to which the present invention is applied.
Figure 3:
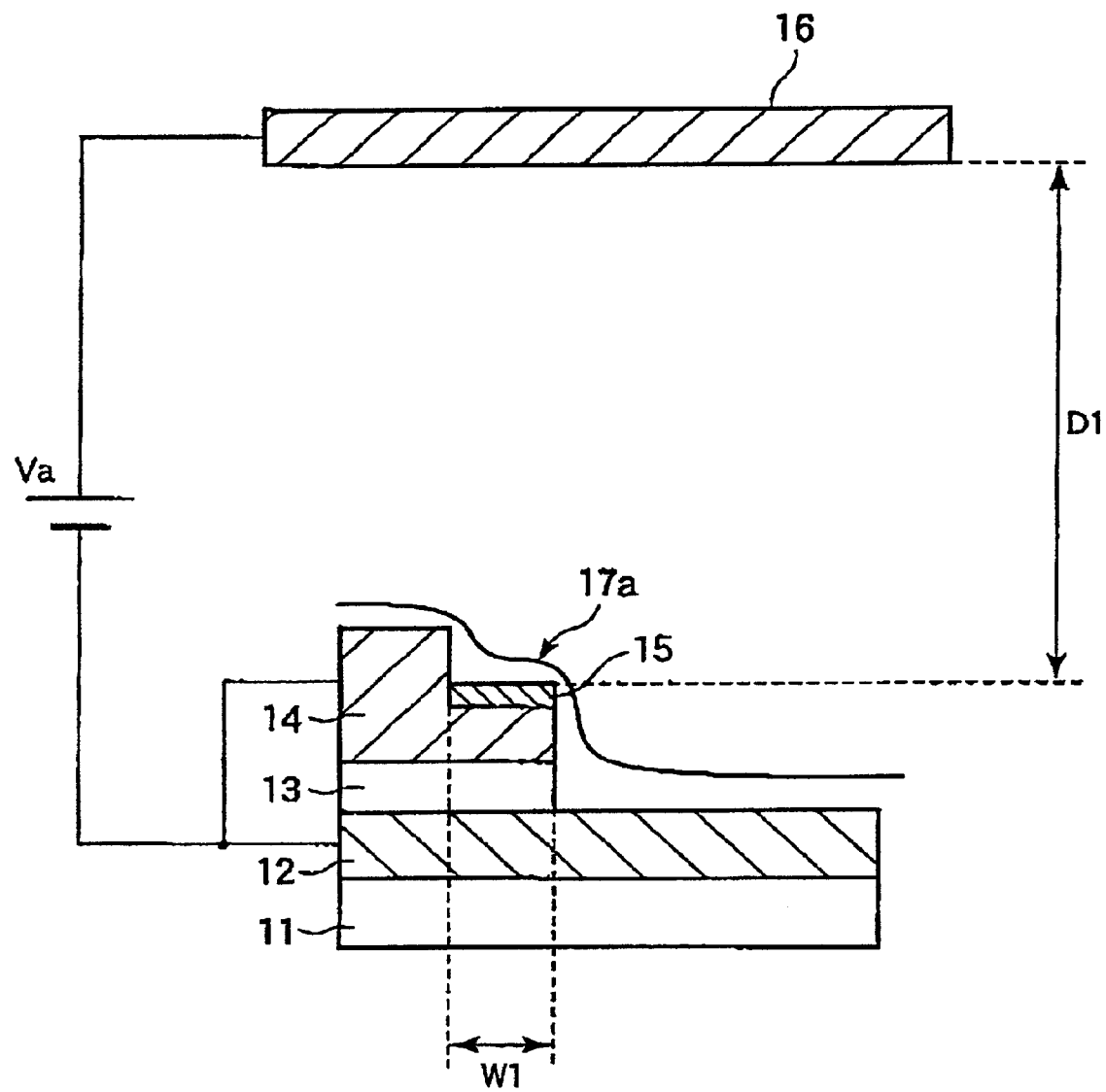
FIG. 3 is a schematic cross-sectional view showing a state where electrons are emitted from the electron-emitting device to which the present invention is applied.
Figure 4:
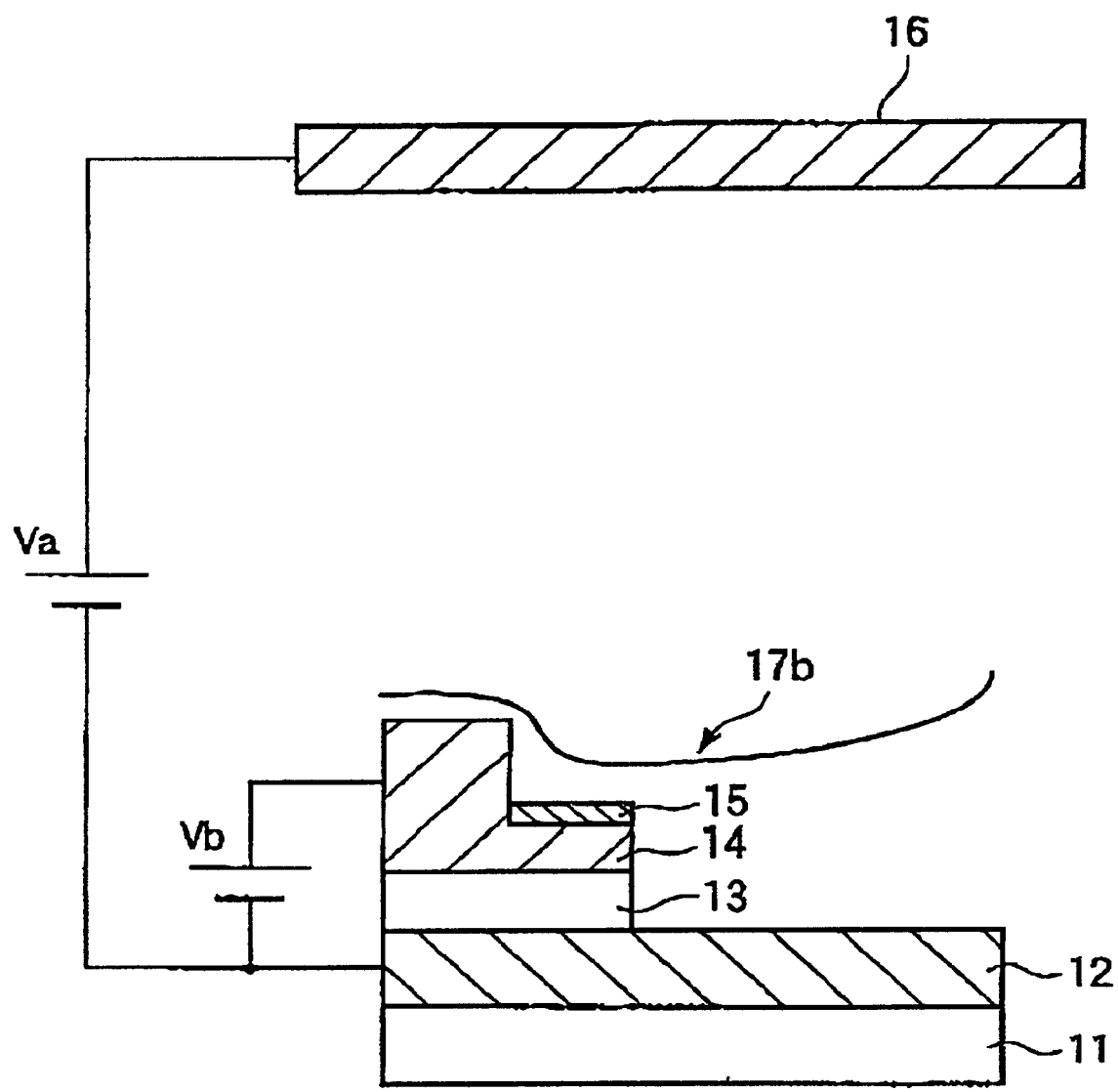
FIG. 4 is a schematic cross-sectional view showing a state where the emission of electrons from the electron-emitting device, to which the present invention is applied, is prohibited.

FIG. 2 is a schematic plain view showing the construction of the electron-emitting device according to an embodiment of the present invention, while FIG. 1 is a schematic diagram of an electron-emitting apparatus in which an anode is disposed so as to oppose the electron-emitting device. Here, FIG. 1 is a schematic cross-sectional view taken along the line 1—1 in FIG. 2. Also, FIG. 3 is a schematic cross-sectional view showing a state where electrons are emitted from the electron-emitting film in the electron-emitting apparatus. Further, FIG. 4 is a schematic cross-sectional view showing a state where the emission of electrons from the electron-emitting film is prohibited in the electron-emitting apparatus.

In FIGS. 1 and 2, reference numeral 11 represents a substrate; numeral 12, a first electrode; numeral 13, an insulating layer; numeral 14, a second electrode; numeral 15, an electron-emitting film that is a conductive film; numeral 16, an anode; symbol W1, the width of the step of the second electrode: and symbol L1, an electrode length.

The width W1 of the step of the second electrode is appropriately set according to the materials and resistance of the components, the work function and driving voltage of the material of the second electrode 14, and the required shape of the electron beam to be emitted. The width W1 is usually set in a range of several nm to several hundred μm, and preferably in a range of several ten nm to several μm. Also, the electrode length L1 is appropriately set according to the materials and resistance value of the components and the position of the electron-emitting device. The electrode length L1 is usually set in a range of several hundred nm to several mm, and preferably in a range from several nm to several hundred μm.

Symbol Va denotes a voltage applied to the anode 16, which is a positive electrode, by a first voltage applying means. The potential applied to the anode 16 is higher than those applied to the first electrode 12 and the second electrode 14. Symbol Vb represents a voltage applied between the first electrode 12 and the second electrode 14 by a second voltage applying means. In more detail, Vb[V]= potential[V] of the first electrode 12-potential[V] of the second electrode 14. The electric field applied to the electron-emitting film 15 is formed by the voltages Va and Vb.

FIG. 3 is a schematic cross-sectional view showing an example driving method where electrons are emitted from the electron-emitting device according to this embodiment. In this drawing, reference numeral 17a represents an equipotential surface formed in the vicinity of the electron-emitting film 15 during the electron emission. This drawing relates to a case where the voltage Vb is set at 0V during the electron emission. The shape of the equipotential surface 17a is determined by the magnitude of the voltage Va and the thickness and width of each component of the electron-emitting device. However, the electric field applied to the end portion of the electron-emitting film 15 is greater than those applied to other portions thereof, so that electrons are emitted only from the end portion. As a result, the beam diameter of the emitted electrons becomes small. In particular, the electric field applied to a portion of the electron-emitting film 15 in the vicinity of the step portion of the second electrode is extremely small. Also, the thickness and width of each component of the electron-emitting devices may be freely set at values suitable for the application purpose.

Also, if the voltage Vb is set at 0V, there may be cases where no electrons are emitted, depending on respective parameters such as the material of the electron-emitting film 15, the shape of the second electrode 14, the distance between the anode 16 and the electron-emitting film 15, and the potential applied to the anode 16. Therefore, with the construction of the electron-emitting device according to this embodiment, the strength of the electric field applied to the end portion of the electron-emitting film 15 is increased not by setting the voltage Vb at 0V but by setting the potential of the first electrode 12 at a value higher than that of the potential of the second electrode 14. This relaxes the requirements that need to be satisfied by the foregoing parameters.

As a result, with the construction of the electron-emitting device of the present invention, the voltage Vb is not limited to 0V That is, when the electron-emitting device of the present invention is driven, it is preferable that the potential of the first electrode 12 is set at a value higher than that of the potential of the second electrode 14. As a result, during the driving of the electron-emitting device of the present invention, the voltage (Vb) applied between the first and second electrodes satisfies a condition "Vb≧0[V]", or preferably a condition "Vb>0[V]".

Also, FIG. 4 is a schematic cross-sectional view showing an example driving method where the electron emission from the electron-emitting device of the present invention is prohibited in this drawing, reference numeral 17b represents an equipotential surface formed in the vicinity of the electron-emitting film 15. In this example, the potential applied to the second electrode 14 is higher than that applied to the first electrode 12 (Vb<0V). The shape of the equipotential surface 17b is determined by the magnitudes of the voltages Va and Vb, a distance D1, and the thickness and width of each component. Because the voltage applied to the second electrode 14 is higher than that applied to the first electrode 12 in this example, the equipotential surface in the vicinity of the end portion of the electron-emitting film 15 is lifted toward the anode 16 and the electric field applied to the end portion of the electron-emitting film 15 is weakened. As a result, no electrons are emitted from the electron-emitting film 15.

Also, a potential difference Vb required to prevent the electron emission from the electron-emitting film 15 is determined by the magnitude of the voltage Va, the distance D1, and the thickness of each component arranged between the substrate and the electron-emitting film 15. The potential difference can be reduced by freely selecting values that are suitable for an application purpose.

Also, in the foregoing electron-emitting device of the present invention, as described by referring to FIG. 3, a surface part (convex portion) of the second electrode 14, whose distance to the anode electrode 16 is shorter than the distance between the electron-emitting film 15 and the anode electrode 16, increases the strength of the electric field applied to the end portion of the electron-emitting film 15. Thus, the strength of the electric field applied thereto becomes greater than those of the electric fields applied to other portions of the electron-emitting film 15. Therefore, it is most preferable that the distance between the anode 16 and part of the surface of the second electrode 14 is shorter than the distance between the anode 16 and the surface of the end portion of the electron-emitting film 15.

Figure 18A:
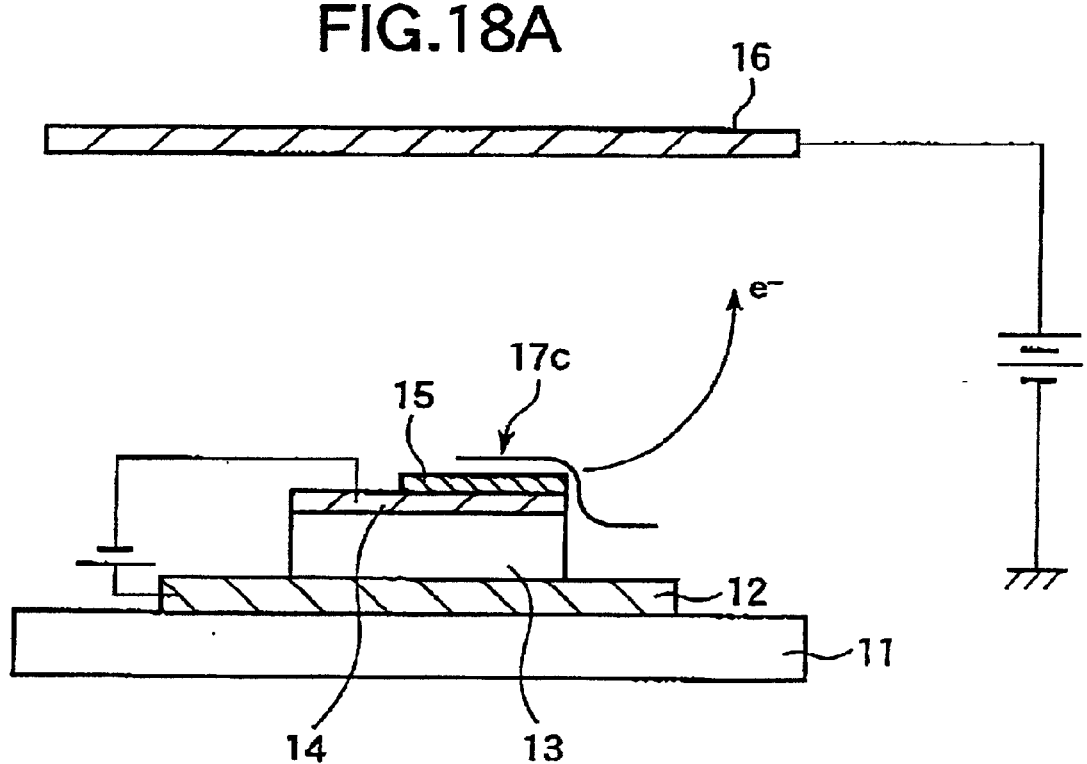
FIGS. 18A and 18B are schematic cross-sectional views used to explain the construction of the electron-emitting device of the present invention.

The electron-emitting device of the present invention, however, may have a construction where the distance between the second electrode 14 and the substrate 11 is shorter than that between the electron-emitting film 15 and the substrate 11 (the distance between the electron-emitting film 15 and the anode electrode 16 is shorter than that between the second electrode 14 and the anode electrode 16). That is, as shown in FIG. 18A, the electron-emitting device may have a construction where the first electrode 12 is arranged on the surface of the substrate 11, the insulating layer 13 is arranged on the first electrode 12, the second electrode 14 is arranged on the insulating film 13, and the electron-emitting film 15 is arranged on the second electrode 14. Note that symbol 17c in FIG. 18A denotes an equipotential surface formed in the vicinity of an electron-emitting portion. Similarly to the case of the electron-emitting device shown in FIG. 3, the driving voltage (voltage applied between the first electrode and the second electrode) Vb in FIG. 18A satisfies the condition "Vb≧0[V]", or preferably the condition "Vb>0[V]".

It should be noted here that in the case of the construction shown in FIG. 18A, like the construction shown in FIGS. 2 and 3, the electron-emitting film 15 is (eccentrically) arranged adjacent to one end portion of the second electrode 14. In other words, the electron-emitting film 15 is arranged so as to be shifted toward one of two side surfaces (edges) of the second electrode 14 that are opposite to each other in a direction substantially parallel to the surface of the substrate. Also, in other words, the electron-emitting film 15 is arranged so as to be shifted toward one of two end portions of the second electrode 14 that are opposite to each other in a direction substantially parallel to the surface of the substrate.

Figure 18B:
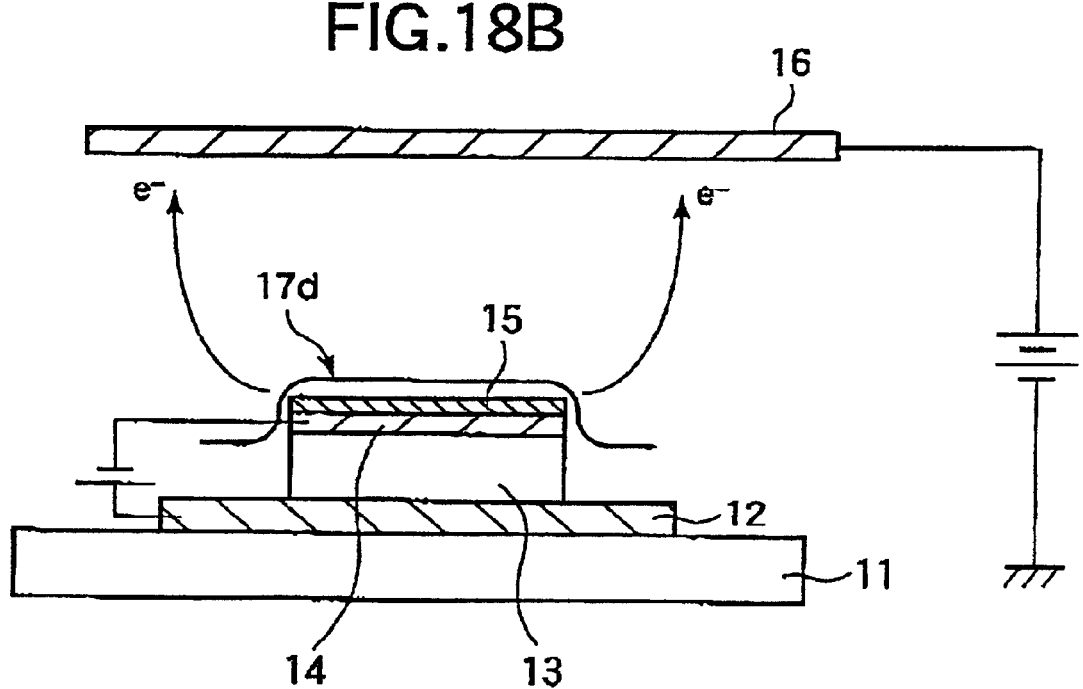

If the electron-emitting film 15 is arranged to entirely cover a surface of the second electrode 14 as shown in FIG. 18B, electrons are emitted from both ends of the electron-emitting film 15 and therefore the diameter of an electron beam is increased. Note that symbol 17d in FIG. 18B denotes an equipotential surface formed in the vicinity of an electron-emitting region.

An example method of manufacturing the foregoing electron-emitting device of the present invention is described below with reference to FIGS. 1 and 5A to 5G.

First, a lamination member is produced by sufficiently cleaning the surfaces of quartz glass, glass in which the amount of impurities, such as Na, is reduced, a soda lime glass, a silicon substrate, or the like, and then laminating $SiO_2$ film thereon with a sputtering method or the like. Alternatively, an insulating substrate is produced using ceramics such as alumina. The lamination member or the insulating substrate is used as the substrate 11. Then, the first electrode 12 is laminated on the substrate 11.

In general, the first electrode 12 has conductivity and is formed with a general vacuum layer formation technique, such as a vapor deposition method or a sputtering method, or a photolithography method. The material of the first electrode 12 is, for instance, appropriately selected from a group of carbon and a carbon compound consisting of metals (such as Be, Mg, Ti, Zr, Hf, V, Nb, Ta, Mo, W, Al, Cu, Ni, Cr, Au, Pt, and Pd), their alloys, a carbide (such as TiC, ZrC, HfC, TaC, SiC, and WC), a boride (such as $HfB_2$, $ZrB_2$, $LaB_6$, $CeB_6$, $YB_4$, and $GdB_4$), a nitride (such as TiN, ZrN, and HfN), a semiconductor (such as Si and Ge), an organic highpolymer material, an amorphous carbon, graphite, diamond like carbon, carbon in which diamond is dispersed, and a carbon compound. The thickness of the first electrode 12 is set in a range of several ten nm to several mm, and preferably in a range of several hundred nm to several $\mu$m.

Next, the insulating layer 13 is stacked on the first electrode 12. The insulating layer 13 is formed with a general vacuum layer formation technique, such as a sputtering method, a CVD method, or a vacuum evaporation method. The thickness of the insulating layer 13 is set in a range of several nm to several $\mu$m, and preferably in a range of several ten nm to several hundred nm. It is preferable that the insulating layer 13 is made of a material, such as $SiO_2$, SiN, $Al_2$, $O_3$, Caf, and undoped diamond, that has a high withstand voltage and is resistant to a high electric field.

Figure 5A:
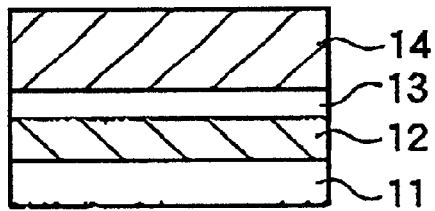
FIGS. 5A, 5B, 5C, 5D, 5E, 5F and 5G show an example method of manufacturing the electron-emitting device to which the present invention is applied.

Further, as shown in FIG. 5A, the second electrode 14 is stacked on the insulating layer 13. Like the first electrode 12, the second electrode 14 has conductivity and is formed with a general vacuum layer formation technique, such as a vapor deposition method or a sputtering method, or a photolithography method. The material of the second electrode 14 is, for instance, appropriately selected from a group consisting of metals (such as Be, Mg, Ti, Zr, Hf, V, Nb, Ta, Mo, W, Al, Cu, Ni, Cr, Au, Pt, and Pd), their alloys, a carbide (such as TiC, ZrC, HfC, TaC, SiC, and WC), a boride (such as $HfB_2$, $ZrB_2$, $LaB_6$, $CeB_6$, $YB_4$, and $GdB_4$), a nitride (such as TiN, ZrN, and HfN), a semiconductor (such as Si and Ge), and an organic highpolymer material. The thickness of the second electrode 14 is set in a range of several nm to several ten $\mu$m, and preferably in a range of several ten nm to several $\mu$m.

It should be noted here that it does not matter whether the first and second electrodes 12 and 14 are made of the same material or different materials. Also, it does not matter whether these electrodes 12 and 14 are formed with the same method or different methods.

Figure 5B:
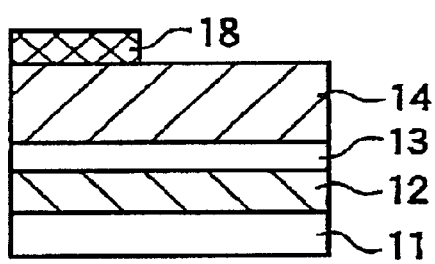

Next, as shown in FIG. 5B, a mask pattern 18 is formed using a photolithography technique.

Figure 5C:
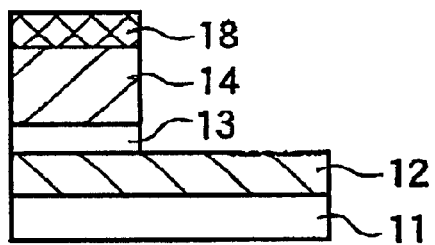

Following this, the lamination structure shown in FIG. 5C is obtained by partially removing the insulating layer 13 and the second electrode 14 from the lamination device including the first electrode 12. Note that it does not matter whether the etching operation is terminated before the first electrode 12 is etched or is continued until the first electrode 12 is partially etched. The etching method used in this etching step is appropriately selected according to the materials of the insulating layer 13 and the second electrode 14.

Figure 5D:
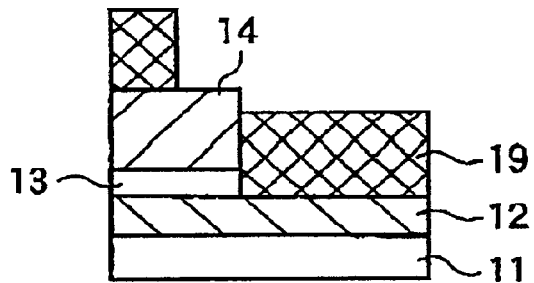

Next, the mask pattern 18 is peeled off and then another mask pattern 19 is formed using a photolithography technique as shown in FIG. 5D.

Figure 5E:
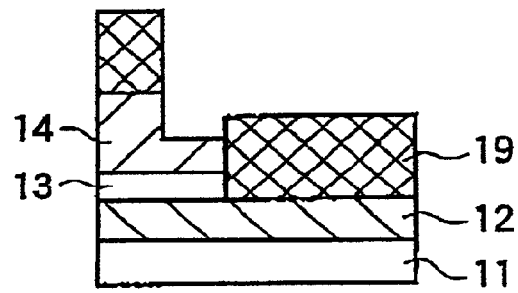

Then, as shown in FIG. 5E, a part of the second electrode 14 is removed to obtain a step-like shape of the second electrode 14. This etching step needs to be terminated before the second electrode 14 is completely etched from the top surface to the bottom surface.

Figure 5F:
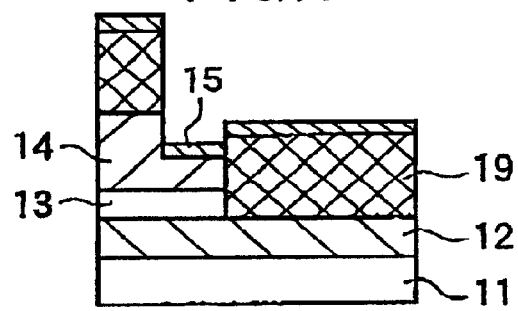

Following this, as shown in FIG. 5F, the electron-emitting film 15 is disposed using a general vacuum layer formation technique, such as a vapor deposition method or a sputtering method, or a photolithography method. The material of the electron-emitting film 15 is, for instance, appropriately selected from a group consisting of graphite, fullerene, carbon nanotubes, graphite nanofibers, diamond like carbon, carbon in which diamond is dispersed. It is preferable that the electron-emitting film 15 is made of a thin diamond film or diamond like carbon having a low work function. It is particularly preferable that the electron-emitting film 15 is made of fiber comprises carbon as a main ingredient (referred to as "fibrous carbon") that easily emit electrons in a low electric field, such as graphitic nanofibers or carbon nanotubes. The thickness of the electron-emitting film 15 is set in a range of several nm to several $\mu$m, and preferably in a range of several nm to several hundred nm.

If the fibers whose main ingredients are carbon are used as the material of the electron-emitting film 15, the electron-emitting film 15 becomes an aggregate of a plurality of fibers whose main ingredients are carbon.

Figure 19:
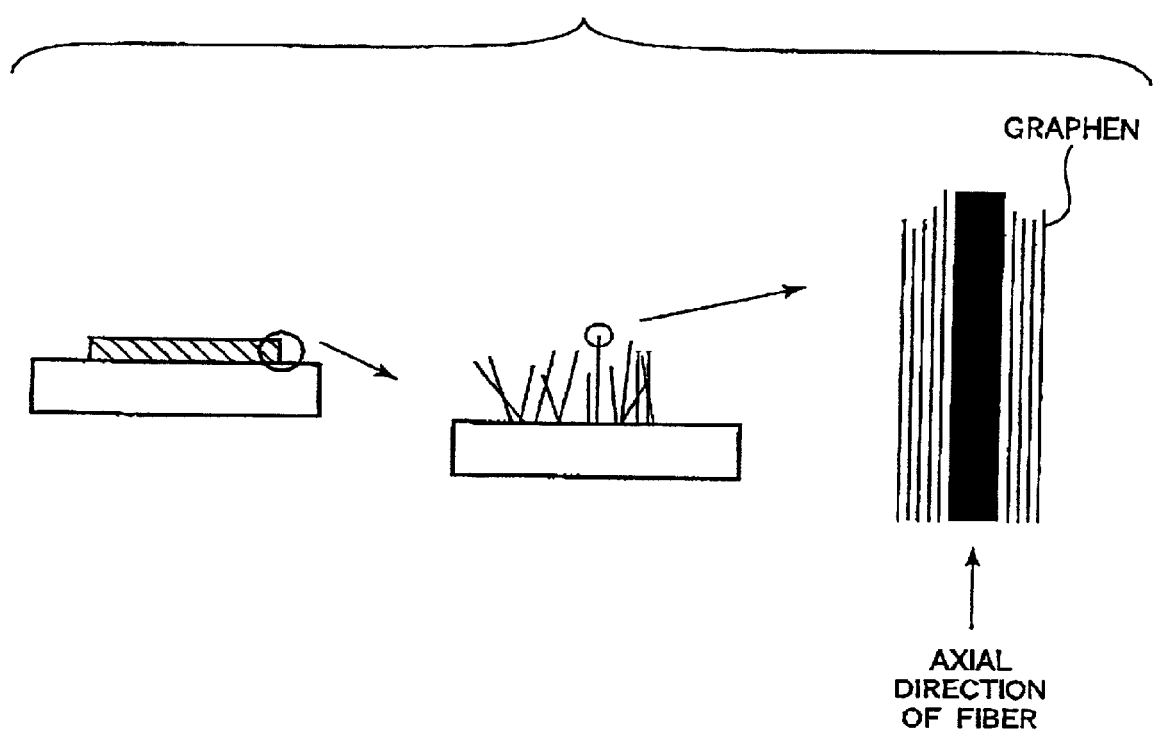
FIG. 19 is a schematic diagram illustrating a construction of a fiber whose main ingredient is carbon.

The fibers whose main ingredients are carbon has a threshold electric field of several V/$\mu$m. Examples of the aggregate of fibers whose main ingredients are carbon are shown in FIGS. 19 and 20. In each drawing, the carbon configuration captured at an optical microscope level (~1000× magnification) is schematically shown in the left area, the carbon configuration captured at a scanning electron microscope (SEM) level (~30000× magnification) is schematically shown in the center area, and the carbon configuration captured at a transmission electron microscope (TEM) level (~1000000× magnification) is schematically shown in the right area.

A graphene that has a cylindrical shape as shown in FIG. 19 is called a carbon nanotube (a cylindrical graphene having a multi-layered structure is called a multi-wall nanotube). In particular, in the case of a shape where the tip of the tube is expanded, the threshold value is reduced to a minimal level.

FIG. 20 shows a fiber that may be produced at a relatively low temperature to include carbon as its main ingredient. The fiber shown in FIG. 20 is a graphene layered product. Therefore, this fiber is called a "graphite nanofiber" in some cases, although the ratio of an amorphous structure increases depending on the temperature. In more detail, the graphite nanofiber is a fibrous substance in which graphens are layered (laminated) in the longitudinal direction thereof (in the axial direction of the fiber). In other words, as shown in FIG. 20, the graphite nanofiber is a fibrous substance in which plurality of graphenes are layered (laminated) so as not to be parallel to the fiber axis.

On the other hand, the carbon nanotube is a fibrous substance in which graphens are arranged (in cylindrical shape) around the longitudinal direction of the fiber (the axial direction of the fiber). In other words, the carbon nanotube is a fibrous substance in which graphenes are arranged substantially parallel to the fiber axis.

It should be noted here that a single plane of graphite is referred to as a "graphene" or a "graphene sheet". In more detail, the graphite has a construction where regular hexagons formed by carbon atoms having covalent bonds attributed to $sp^2$ hybrid orbital are arranged to form a carbon plane and a plurality of carbon planes having such a construction are laminated with a distance of 3.354 Å therebetween. Each of these carbon planes is referred to as a "graphene" or a "graphene sheet".

In either case of these fibers whose main ingredients are carbon, the threshold value concerning electron emission is around 1V-10V/µm. Therefore, these fibers are both suitable as the material of the electron-emitting film 15 of the present invention.

In particular, an electron-emitting device using an aggregate of graphite nanofibers causes electron emission in a low electric field, achieves large emission current, is easy to be manufactured, and has a stable electron-emitting characteristic. Also, in an electron-emitting apparatus, light-emitting apparatus, and image display apparatus using the graphite nanofibers, stable electron emission is performed without maintaining the inside of these apparatuses in a ultra-high vacuum state, unlike conventional electron-emitting devices. Also, electrons are emitted in a low electric field, so that an apparatus with a high degree of reliability is manufactured without difficulty.

The stated fibers whose main ingredients are carbon can be produced by dissolving a hydrocarbon gas using a catalyst (a material promoting the deposition of carbon). The carbon nanotube differs from the graphite nanofiber in the type of a catalyst and the dissolving temperature.

As to the material of the catalyst, a material such as Fe, Co, Pd, or Ni, or an alloy of materials selected therefrom may be used as a nucleus for forming a fiber whose main ingredient is carbon.

In particular, in the case of Pd or Ni, it is possible to produce a graphite nanofiber at a low temperature (400° C. or higher). If a carbon nanotube is produced using Fe or Co, however, the temperature needs to be increased to 800° C. or higher. Because the production of a graphite nanofiber using Pd or Ni is possible at a low temperature, these materials are preferable in terms of the effects on other components and the manufacturing cost.

Further, by utilizing a characteristic that oxides are reduced by hydrogen at a low temperature (room temperature) in the case of Pd, the nucleus may be formed using palladium oxide.

If the palladium oxide is subjected to a hydrogen reduction process, it becomes possible to form an initial aggregation nucleus at a relatively low temperature (200° C. or lower) without using a conventional nucleus formation technique, such as the heat aggregation of a thin metal film or the generation and vapor deposition of ultra-fine particles.

As the hydrocarbon gas described above, there may be used a hydrocarbon gas (such as ethylene, methane, propane, or propylene), CO gas, $CO_2$ gas, or a steam of an organic solvent (such as ethanol or acetone), for instance.

Figure 5G:
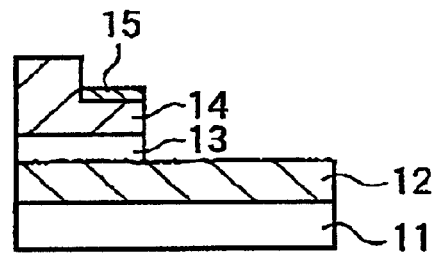

Finally, the mask pattern 19 is peeled off as shown in FIG. 5G. In this manner, the electron-emitting device of the present invention is manufactured.

The electron-emitting device shown in FIG. 1 that has been described above as an example of the present invention has a construction where the first electrode 12 is disposed on the substrate 11 and a convex portion composed of the insulating layer 13, the second electrode 14, and the electron-emitting film 15 is formed on a part of the surface of the first electrode 12. Also, a part of the second electrode 14 has a step-like shape and the electron-emitting film 15 is disposed on the lower surface of the second electrode 14. However, the electron-emitting device of the present invention is not limited to this construction and the second electrode 14 may be composed of a plurality of layers. Also, so long as the layers are electrically connected and have the same potential, it is not required that these layers are successively laminated on each other. That is, at least one different component, such as the electron-emitting film 15 or the insulating layer 13, may be inserted between the second electrode layers. Further, the first electrode 12 may be disposed only in an area of the substrate 11 in which the convex portion is not formed. Also, the surface of the electron-emitting film 15 may have any one of a polygon shape, a slit shape, at least one part of a circle shape, and at least one part of an ellipse shape.

Example applications of the electron-emitting device of the present invention are described below.

For instance, an electron source or an image-forming apparatus may be constructed by arranging a plurality of the electron-emitting devices of the present invention on a substrate.

Figure 6:
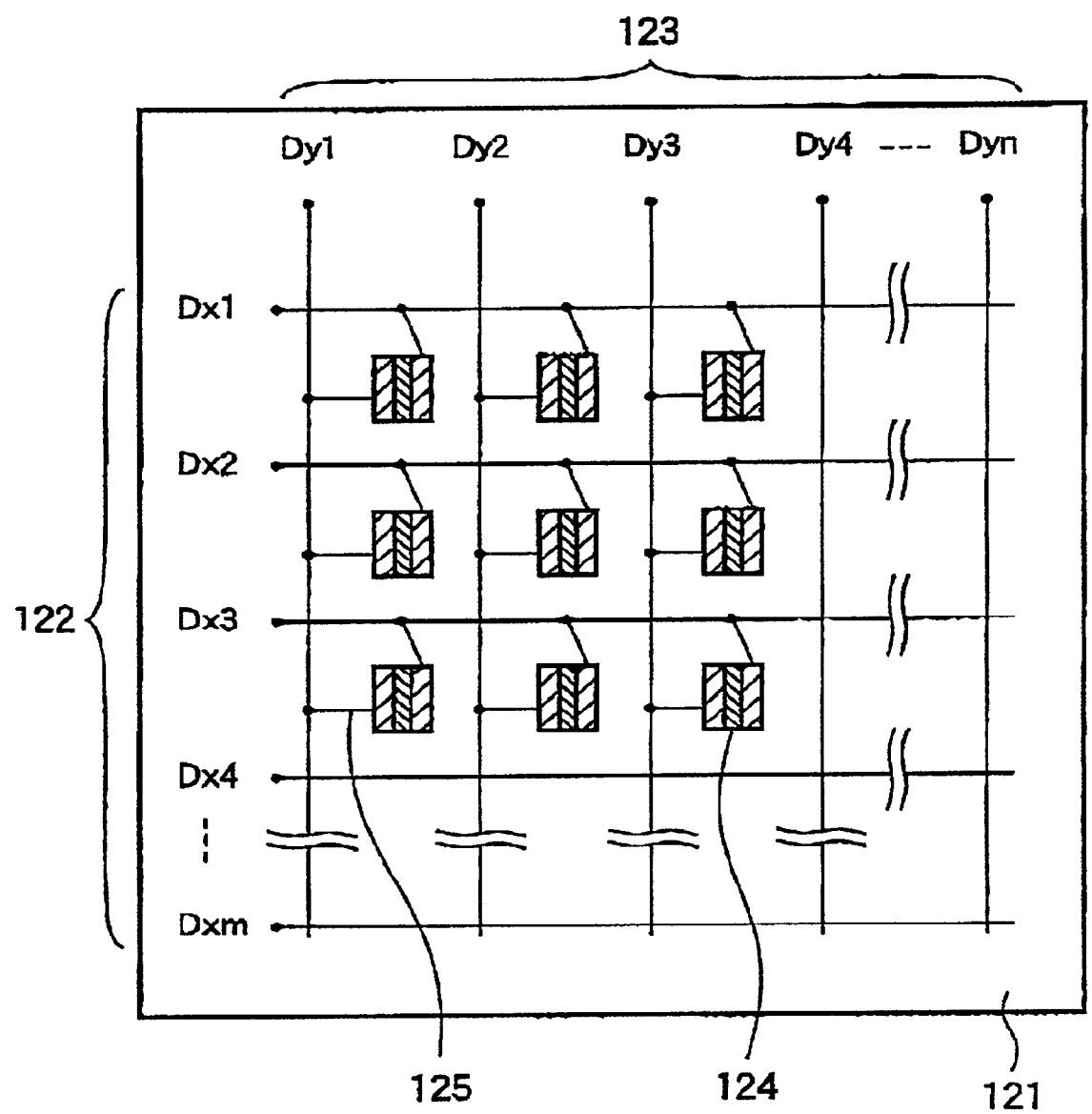
FIG. 6 is a schematic view showing the construction of an electron source having passive matrix configuration according to an embodiment of the present invention.

An electron source produced by arranging a plurality of the electron-emitting devices of the present invention is described below with reference to FIG. 6. In this drawing, symbol 121 denotes an electron source substrate, numeral 122 X-directional wiring, numeral 123 Y-directional wiring, numeral 124 the electron-emitting devices according to the present invention, and numeral 125 connection wiring.

There are m X-directional wiring 122 (Dx1, Dx2, . . . , Dxm) that are made of a conductive metal or the like using a vacuum evaporation method, a printing method, a sputtering method, or the like. The material, thickness, and width of each wire is determined as appropriate. There are n Y-directional wiring 123 (Dy1, Dy2, . . . , Dyn) that are produced in the same manner as the X-directional wiring 122. An interlayer insulating layer (not shown) is provided between the m X-directional wiring 122 and the n Y-directional wiring 123 so as to electrically insulate these wiring. Here, m and n are each a positive integer.

The interlayer insulating layer (not shown) is made of $SiO_2$ or the like using a vacuum evaporation method, a printing method, a sputtering method, or the like. For instance, the interlayer insulating layer having a desired shape is produced to cover the entire or a part of the surface of the electron source substrate 121 on which the X-directional wiring 122 have been formed. In particular, the thickness, material, and production method of the interlayer insulating layer are determined as appropriate so that the interlayer insulating layer is resistant to potential differences at the intersections of the X-directional wiring 122 and the Y-directional wiring 123. The X-directional wiring 122 and the Y-directional wiring 123 are extended to the outside as external terminals.

A pair of electrode layers (not shown) constituting the electron-emitting device 124 are electrically connected to the m X-directional wiring 122 and the n Y-directional wiring 123 by the connection wiring 125 made of a conductive metal or the like.

The X-directional wiring 122, the Y-directional wiring 123, the connection wiring 125, and the pair of device electrodes may be made of partially or completely the same component devices or made of different devices. The foregoing wiring are made of materials appropriately selected from the foregoing materials of the first electrode 12 and the second electrode 14 that are the device electrodes. If the same material is used to produce the device electrodes and the wiring, the wiring connected to the device electrodes may also be called device electrodes. Also, the device electrodes may be used as wiring electrodes.

To select the rows of the electron-emitting device 124 arranged in the X-direction, a scanning signal applying means (not shown) for applying a scanning signal is connected to the X-directional wiring 122. On the other hand, to modulate each column of the electron-emitting device 124 arranged in the Y-direction according to an input signal, a modulation signal generating means (not shown) is connected to the Y-directional wiring 123. The driving voltage applied to each electron-emitting device is supplied as the difference voltage between the scanning signal and the modulation signal applied to the electron-emitting device.

The above-mentioned construction makes it possible to select respective electron-emitting devices and independently drive the selected electron-emitting devices using a passive matrix wiring. An image-forming apparatus formed using an electron source having the foregoing passive matrix configuration is described below with reference to FIG. 7. This drawing is a schematic diagram showing an example of a display panel of the image-forming apparatus.

Referring to FIG. 7, reference numeral 121 represents a substrate of the electron source on which a plurality of the electron-emitting devices 124 of the present invention are arranged in the manner described above, numeral 131 a rear plate to which the electron source substrate 121 is secured, numeral 136 a face plate having a construction where a fluorescent film 134 (a phosphor), a metal back 135, and the like serving as image forming members are formed on the internal surface of a glass substrate 133, and numeral 132 a support frame. An envelope 137 is formed using the rear plate 131, the support frame 132, and the face plate 136 by applying frit glass or the like to their connection portions and then baking, in the air or a nitrogen atmosphere, the foregoing components at 400° C. to 500° C. for 10 minutes or longer to seal the components.

The envelope 137 is, as described above, formed by the face plate 136, the support frame 132, and the rear plate 131. Because the rear plate 131 is provided to mainly reinforce the strength of the electron source substrate 121, the rear plate 131 is not required if the electron source substrate 121 itself has sufficient strength. In this case, the support frame 132 may be directly sealed to the electron source substrate 121 to form the envelope 137 using the face plate 136, the support frame 132, and the electron source substrate 121. Also, by inserting a support member called a spacer (not shown) between the face plate 136 and the rear plate 131, the envelope 137 may be made to be sufficiently strong against the atmospheric pressure.

Figure 8A:
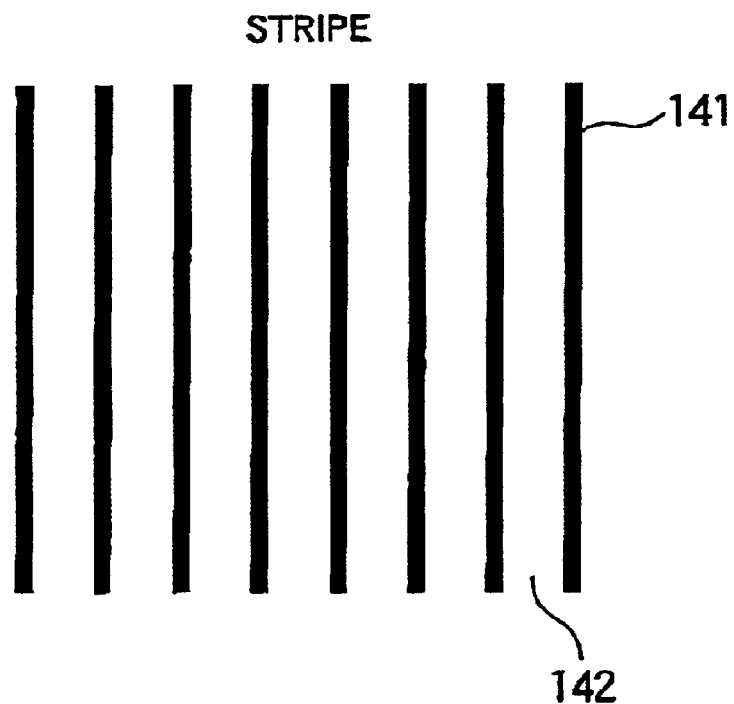
FIGS. 8A and 8B each show a fluorescent film in the image-forming apparatus according to the embodiment of the present invention.
Figure 8B:
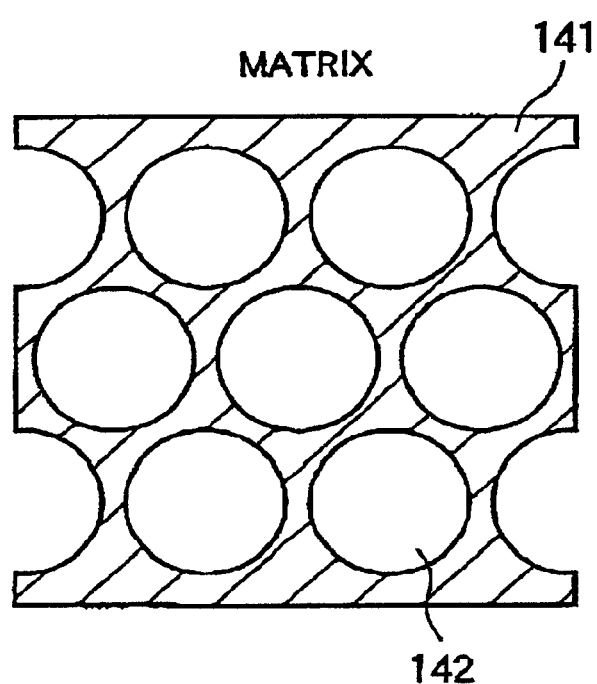

It should be noted here that in the image-forming apparatus using the electron-emitting devices according to the present invention, a phosphor(the fluorescent film 134) is arranged in alignment over the electron-emitting devices 124 in consideration of the trajectory of emitted electrons. FIGS. 8A and 8B are each a schematic diagram of the fluorescent film 134 used in the panel. In the case where the fluorescent film 134 is a color fluorescent film, the fluorescent film 134 is composed of phosphors 142 and black conductive members 141 that are called a black stripe (see FIG. 8A) or a black matrix (see FIG. 8B) depending on the arrangement style of the phosphors.

The image-forming apparatus according to the present invention may be used as a display apparatus for television broadcasting, a display apparatus for a video conference system, a computer or the like. Furthermore, the image-forming apparatus according to the present invention may be used as an image-forming apparatus for a laser printer comprising a photosensitive drum or the like.

<Embodiments>

Embodiments of the present invention are described in detail below.

<First Embodiment>

FIG. 2 is a plan view of the electron-emitting apparatus of the first embodiment. FIG. 1 is a cross sectional view of the electron-emitting apparatus, and FIGS. 5A to 5G show a method of manufacturing the electron-emitting apparatus. The method of manufacturing the electron-emitting apparatus of this embodiment is described in detail below.

(Step 1)

Firsts as shown in FIG. 5A, with a sputtering method, the first electrode 12 that is an Al film having a thickness of 300 nm, the insulating layer 13 that is an $SiO_2$ film having a thickness of 100 nm, and the second electrode 14 that is a Ta film having a thickness of 400 nm are stacked in this order on the substrate 11 that is a sufficiently cleaned quartz glass.

(Step 2)

Next, as shown in FIG. 5B, a photomask pattern of a positive photoresist (AZ1500 manufactured by Clariant) is formed by spin coating, and is exposed to light and developed with a photolithography method to obtain a mask pattern 18. Then, as shown in FIG. 5C, dry etching is performed using $CF_4$ gas from above of the mask pattern 18 functioning as a mask, so that the insulating layer 13 and the second electrode 14 are etched. This etching operation is terminated before the first electrode 12 is also processed.

(Step 3)

Following this, the mask pattern 18 is peeled off. Then, as shown in FIG. 5D, a photomask pattern of a positive photoresist (AZ1500 manufactured by Clariant) is formed by spin coating, and is exposed to light and developed with a photolithography method to obtain a mask pattern 19. Then, dry etching is performed using $CF_4$ gas from above of the mask pattern 19 functioning as a mask to obtain the step-like shape of the second electrode 14 shown in FIG. 5E. The difference in height between the upper surface and lower surface of the second electrode 14 is set at 300 nm, the electrode length L1 is set at 100 μm, and the width of the lower surface is set at 0.5 μm.

(Step 4)

Next, as shown in FIG. 5F, a diamond like carbon film having a thickness of 100 nm is formed as the electron-emitting film 15 using a CVD (chemical vapor deposition) method.

Finally, the mask pattern 19 used as a mask is completely removed to obtain the electron-emitting device of this embodiment shown in FIG. 5G.

Electron emission is performed by arranging the thus-manufactured electron-emitting device in the manner shown in FIG. 3. The applied voltage Va is set at 10 kV and the distance D1 between the electron-emitting film 15 and the anode 16 is set at 2 mm. Here, an electrode formed by applying a phosphor is used as the anode 16. Under these condition, electron emission is performed and the electron beam diameter is observed. The term "electron beam diameter" refers to a size of a beam area in which is observed at least 10% of the peak brightness of the light emitted from the phosphor. The electron beam diameter becomes 80 $\mu$m/200 $\mu$m (x/y) in this embodiment.

Also, when voltages are applied so that the potential of the second electrode 14 becomes higher than that of the first electrode 12 and the difference between these voltages becomes 4V (which is to say Vb=4V), the electron-emitting device of this embodiment does not emit any electrons as shown in FIG. 4. As is apparent from this, it is possible to drive the electron-emitting device of this embodiment at a very low voltage.

<Second Embodiment>

A schematic cross-sectional view of the electron-emitting device manufactured in the second embodiment is shown in FIG. 1. In this embodiment, the second electrode layer 14 of the first embodiment is produced by laminating a Ta film and an Al film to prevent the unevenness of the lower surface of the second electrode layer 14 having a step-like shape due to the device. The following description centers on the characteristic points of this embodiment and therefore the same points as in the first embodiment are omitted.

Similarly to the first embodiment, after the first electrode 12 and the insulating layer 13 are laminated on the substrate 11, an Al film having a thickness of 100 nm and a Ta film having a thickness of 300 nm are stacked in this order as the second electrode 14.

Following this, like in the first embodiment, a mask pattern 18 is formed, the Ta film of the second electrode 14 and the insulating layer 13 are dry etched using $CF_4$ gas, and the Al film of the second electrode 14 is dry etched using $Cl_2$ gas. This etching operation is terminated before the first electrode 12 is also processed.

Then, like in the first embodiment, the mask pattern 18 is peeled off, another mask pattern 19 is formed, and the second electrode 14 is processed using $CF_4$ gas to obtain the step-like shape of the second electrode 14. It is impossible to remove the Al film using $CF_4$ gas, so that the thickness of each film of the second electrode 14 becomes even and the unevenness of the lower surface of the second electrode 14 is prevented.

Other aspects of this embodiment are the same as those of the first embodiment and so are omitted.

<Third Embodiment>

A schematic cross-sectional view of the electron-emitting device manufactured in the third embodiment is shown in FIG. 1. In this embodiment, the applied voltage Va is increased so as to improve the current amounts of emitted electrons. The following description centers on the characteristic points of this embodiment and therefore the same points as in the aforementioned embodiments are omitted.

In this embodiment, the voltage Va applied to drive the electron-emitting device of the first embodiment is set at 15 kV and the distance D1 between the electron-emitting film 15 and the anode 16 is set at 2 mm.

The electron-emitting device performs electron emission by means of the electric field formed by the anode voltage, so that the increased anode voltage improves the current amounts of the emitted electrons in this embodiment At the same time, however, the area from which electrons are emitted is also extended and therefore the beam diameter of the emitted electrons is increased.

<Fourth Embodiment>

Figure 9:
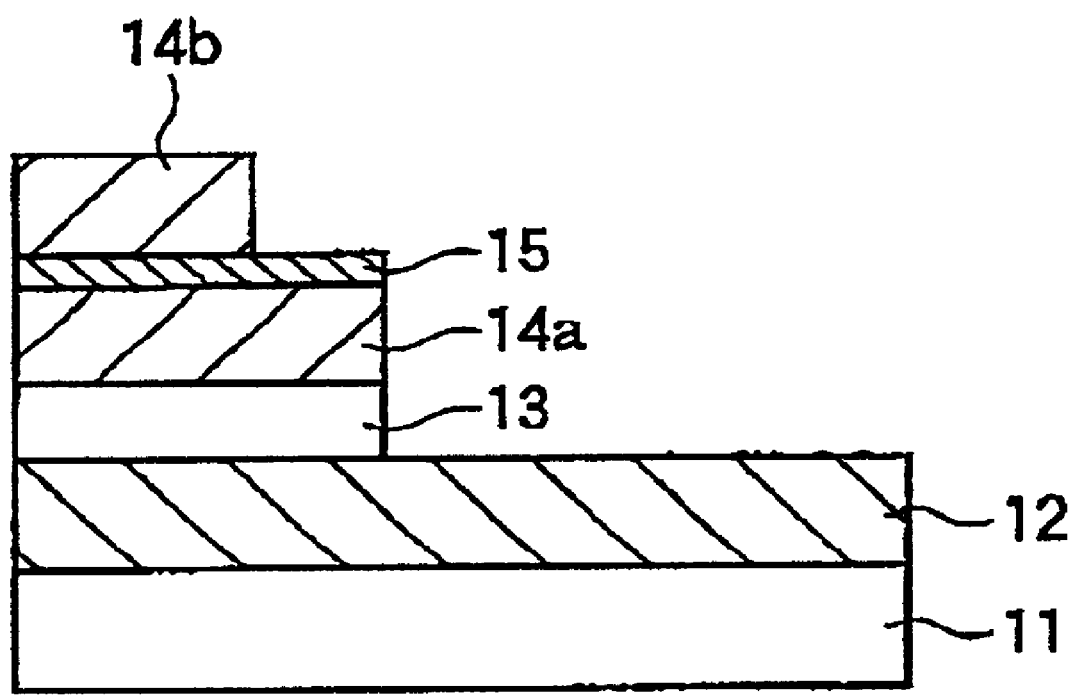
FIG. 9 is a schematic cross-sectional view of an electron-emitting device according to a fourth embodiment.

FIG. 9 is a schematic cross-sectional view of the electron-emitting device manufactured in this embodiment, and FIGS. 10A to 10F show a method of manufacturing the same. In this embodiment, the electron-emitting film 15 is sandwiched between layers of the second electrode 14. The electron-emitting device having this construction can be manufactured more easily. The method of manufacturing the electron-emitting device of this embodiment is described in detail below.

(Step 1)

Figure 10A:
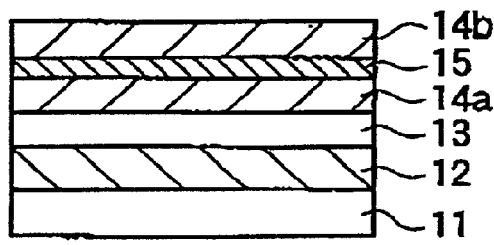
FIGS. 10A, 10B, 10C, 10D, 10E and 10F show an example method of manufacturing the electron-emitting device according to the fourth embodiment.

First, as shown in FIG. 10A, the substrate 11 is prepared by sufficiently cleaning a quartz glass. Following this, with a sputtering method, the first electrode 12 that is an Al film having a thickness of 300 nm, the insulating layer 13 that is an $SiO_2$ film having a thickness of 100 nm, a second electrode layer 14a that is a Ta film having a thickness of 100 nm, the electron-emitting film 15 that is a diamond like carbon film having a thickness of 100 nm, and a second electrode layer 14b that is a Ta film having a thickness of 200 nm are stacked onto the substrate 11 in this order.

(Step 2)

Figure 10B:
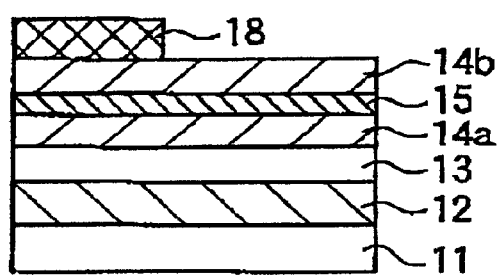
Figure 10C:
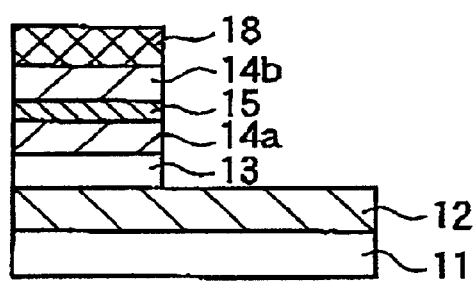

Next, as shown in FIG. 10B, a photomask pattern of a positive photoresist (AZ1500 manufactured by Clariant) is formed by spin coating, and is exposed to light and developed with a photolithography method to obtain a mask pattern 18. Then, as shown in FIG. 10C, dry etching is performed using $CF_4$ gas from above of the mask pattern 18 functioning as a mask, so that the insulating layer 13, the second electrode layer 14a, the electron-emitting film 15, and the second electrode layer 14b are etched. This etching operation is terminated before the first electrode 12 is also processed.

(Step 3)

Figure 10D:
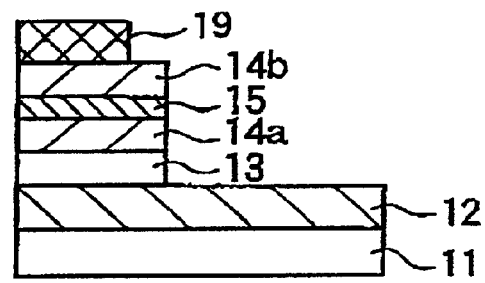
Figure 10E:
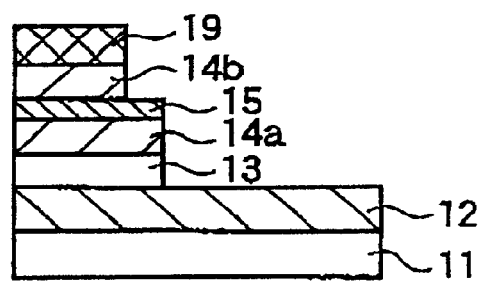

Following this, the mask pattern 18 is peeled off Then, as shown in FIG. 10D, a photomask pattern of a positive photoresist (AZ1500 manufactured by Clariant) is formed by spin coating, and is exposed to light and developed with a photolithography method to obtain a mask pattern 19. Then, dry etching is performed using $CF_4$ gas from above of the mask pattern 19 functioning as a mask, so that the second electrode layer 14b is etched and the electron-emitting film 15 obtains an exposed portion as shown in FIG. 10E.

(Step 4)

Figure 10F:
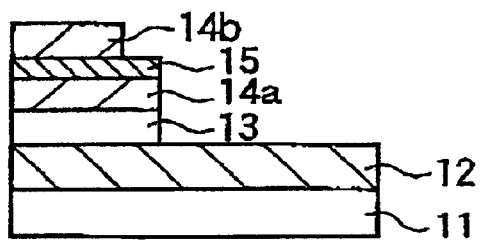

Finally, the mask pattern 19 used as a mask is completely removed to obtain the electron-emitting device of this embodiment shown in FIG. 10F. Similarly to the case of the electron-emitting device of the first embodiment, the electrode length L1 of this electron-emitting device is set to 100 $\mu$m.

The thus-manufactured electron-emitting device is driven under a condition where Va=10 kV, Vb=0V, and D1=2 mm. The electron emission performed in this case achieves an electron-emitting characteristic that is almost the same as in the case of the electron-emitting device of the first embodiment.

<Fifth Embodiment>

Figure 11:
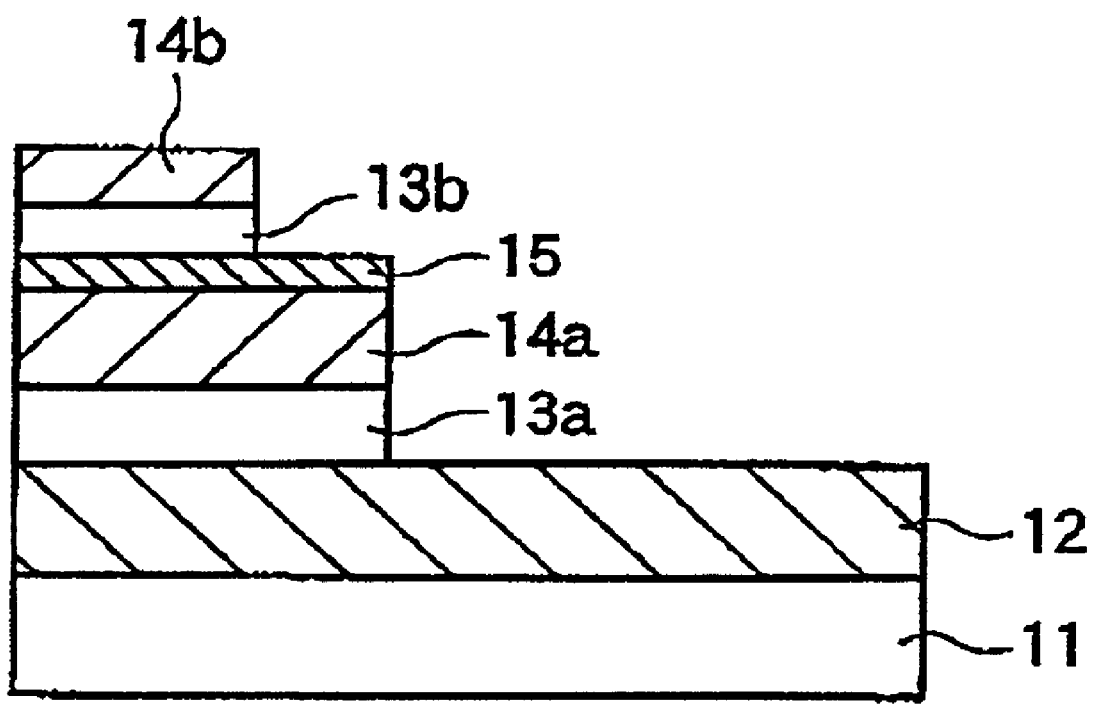
FIG. 11 is a schematic cross-sectional view of an electron-emitting device according to a fifth embodiment.

FIG. 11 is a schematic cross-sectional view of the electron-emitting device manufactured in this embodiment. This embodiment relates to a construction where an insulating layer 13b is inserted between the electron-emitting film 15 and the second electrode layer 14b of the electron-emitting device of the fourth embodiment. It will become apparent from this embodiment that there occurs no change in the characteristics of the electron-emitting device even with the construction where the insulating layer 13b is sandwiched between the components. The following description centers on the characteristic points of this embodiment and therefore the same points as in the above-mentioned embodiments are omitted.

Similarly to the fourth embodiment, the first electrode 12, the insulating layer 13a, the second electrode layer 14a, and the electron-emitting film 15 are laminated on the substrate 11. Then, the insulating layer 13b that is an $SiO_2$ film having a thickness of 100 nm and the second electrode layer 14b that is a Ta film having a thickness of 100 nm are stacked in this order onto the electron-emitting film 15.

Following this, like in the fourth embodiment, the mask pattern 18 is formed and dry etching is performed for the insulating layer 13a, the second electrode layer 14a, the electron-emitting film 15, the insulating layer 13b, and the second electrode layer 14b. This etching operation is terminated before the first electrode layer 12 is also processed.

Then, like in the fourth embodiment, the mask pattern 18 is peeled off, another mask pattern 19 is formed, and the second electrode layer 14b and the insulating layer 13b are subjected to dry etching to obtain an exposed portion of the electron-emitting film 15.

Other aspects of this embodiment are the same as those of the third embodiment and so are omitted.

To drive the electron-emitting device of this embodiment, the second electrode layer 14a and the second electrode layer 14b are connected to each other to have the same potential outside the electron-emitting device.

The thus-manufactured electron-emitting device is driven under a condition where Va=10 kV, Vb=0V, and D1=2 mm. The electron emission performed in this case achieves an electron-emitting characteristic that is almost the same as in the case of the electron-emitting device of the first embodiment.

<Sixth Embodiment>

Figure 12:
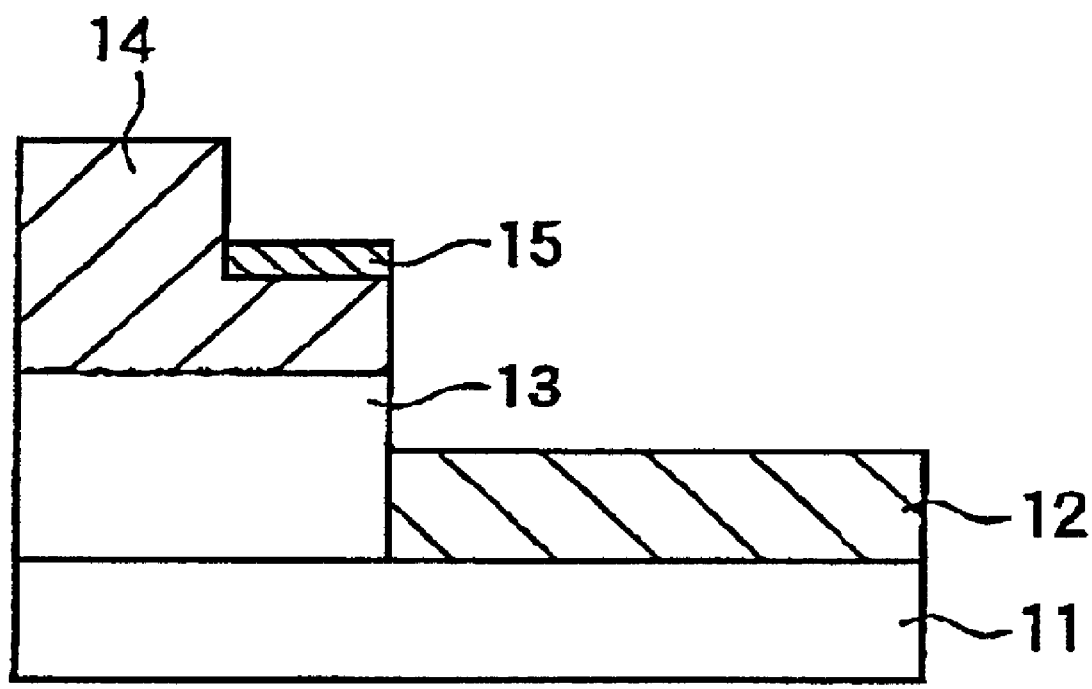
FIG. 12 is a schematic cross-sectional view of an electron-emitting device according to a sixth embodiment.

FIG. 2 is a schematic plan view of the electron-emitting device manufactured in this embodiment, FIG. 12 is a schematic cross-sectional view of the electron-emitting device, and FIGS. 13A to 13H show a method of manufacturing the electron-emitting device. In this embodiment, the first electrode 12 is stacked only in an area of the substrate 11 in which a convex portion composed of the insulating layer 13, the second electrode 14, and the electron-emitting film 15 is not formed. The method of manufacturing the electron-emitting device of this embodiment is described in detail below.

(Step 1)

Figure 13A:
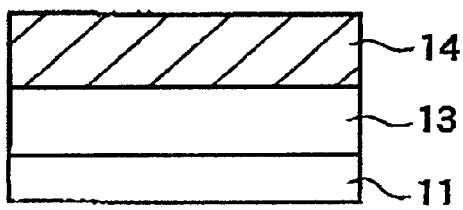
FIGS. 13A, 13B, 13C, 13D, 13E, 13F, 13G and 13H show an example method of manufacturing the electron-emitting device according to the sixth embodiment.

First, as shown in FIG. 13A, the substrate 11 is prepared by sufficiently cleaning a quartz glass. Following this, with a sputtering method, the insulating layer 13 that is an $SiO_2$ film having a thickness of 300 nm and the second electrode 14 that is a Ta film having a thickness of 400 nm are stacked in this order onto the substrate 11.

(Step 2)

Figure 13B:
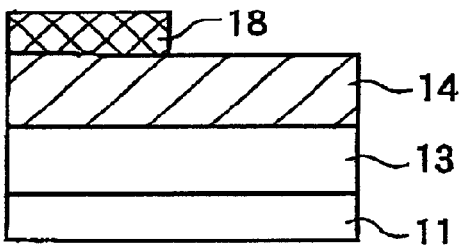
Figure 13C:
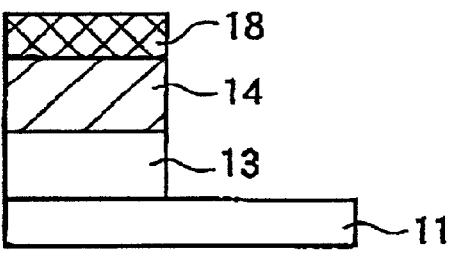
Figure 13D:
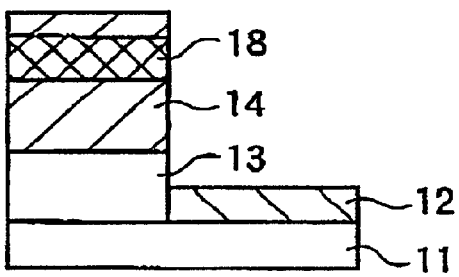

Next, as shown in FIG. 13B, a photomask pattern of a positive photoresist (AZ1500 manufactured by Clariant) is formed by spin coating, and is exposed to light and developed with a photolithography method to obtain a mask pattern 18. Then, as shown in FIG. 13C, dry etching is performed using $CF_4$ gas from above of the mask pattern 18 functioning as a mask, so that the insulating layer 13 and the second electrode 14 are etched. This etching operation is terminated before the substrate 11 is also processed. Following this, as shown in FIG. 13D, an Al film having a thickness of 200 nm is stacked as the first electrode 12.

(Step 3)

Figure 13E:
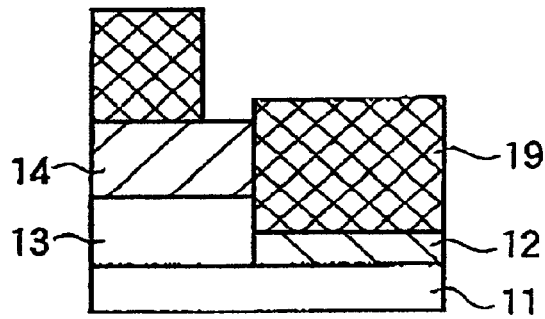
Figure 13F:
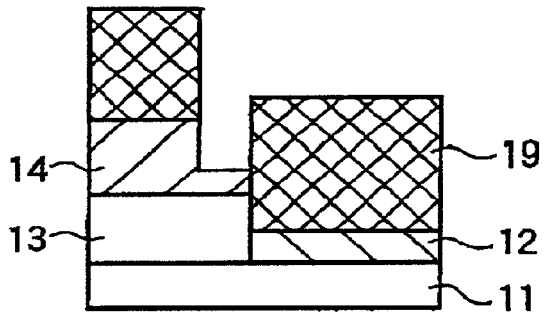

Next, the mask pattern 18 is peeled off. Then, as shown in FIG. 13E, a photomask pattern of a positive photoresist (AZ1500 manufactured by Clariant) is formed by spin coating, and is exposed to light and developed with a photolithography method to obtain a mask pattern 19. Then, dry etching is performed using $CF_4$ gas from above of the mask pattern 19 functioning as a mask, thereby obtaining a step-like shape of the second electrode 14 shown in FIG. 13F. The difference in height between the upper surface and the lower surface of the second electrode 14 is set to 300 nm, the electrode length L1 is set at 100 µm, and the width of the lower surface is set to 0.5 µm.

(Step 4)

Figure 13G:
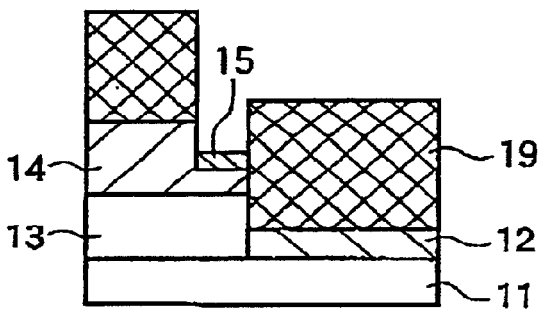

Following this, as shown in FIG. 13G, a diamond film having a thickness of 100 nm is stacked as the electron-emitting film 15 with a CVD method.

Figure 13H:
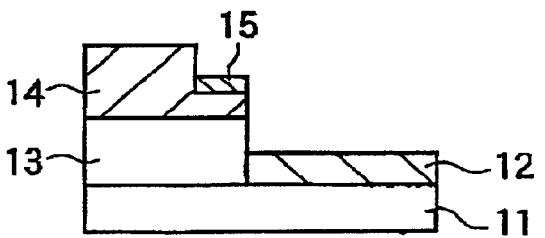

Finally, the mask pattern 19 used as a mask is completely removed to obtain the electron-emitting device of this embodiment shown in FIG. 13H.

The thus-manufactured electron-emitting device is driven under a condition where Va=10 kV, Vb=0V, and D1=2 mm. The electron emission performed in this case achieves an electron-emitting characteristic that is almost the same as in the case of the electron-emitting device of the first embodiment.

<Seventh Embodiment>

The electron-emitting device of this embodiment has a construction where electron-emitting devices whose constructions are based on the first-sixth embodiments are arranged to oppose each other. In this embodiment, electron-emitting devices having a construction based on the first example are arranged to oppose each other. With this construction, the intensity of light emitted by a phosphor is increased.

Figure 14:
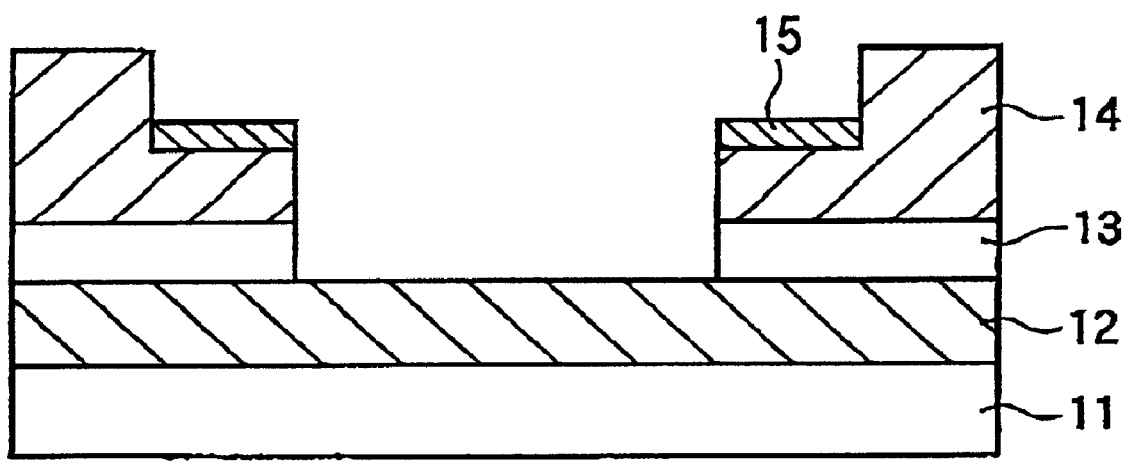
FIG. 14 is a schematic cross-sectional view of an electron-emitting device according to the seventh embodiment.
Figure 15:
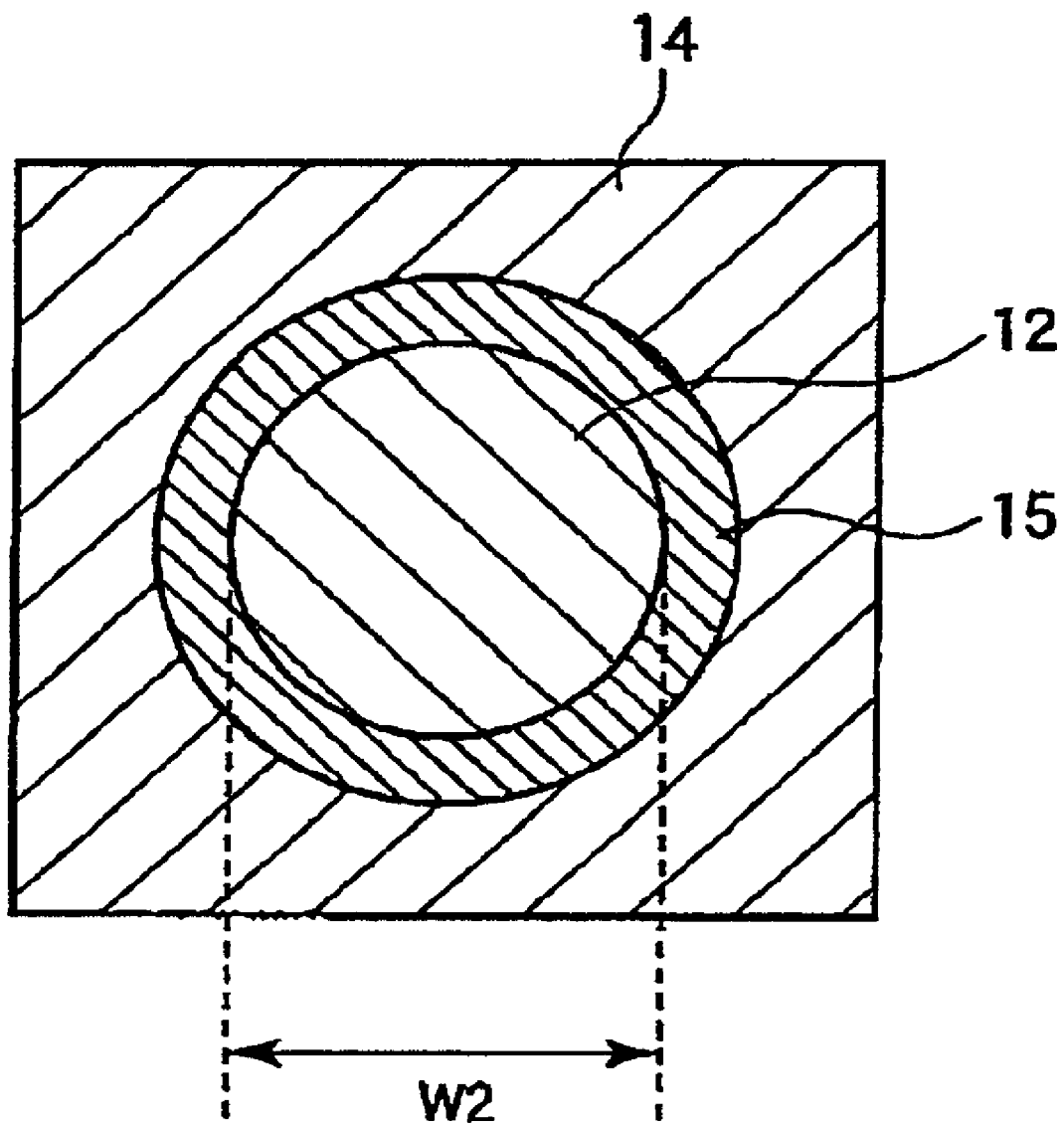
FIG. 15 is a schematic plain view of the electron-emitting device according to the seventh embodiment.
Figure 16:
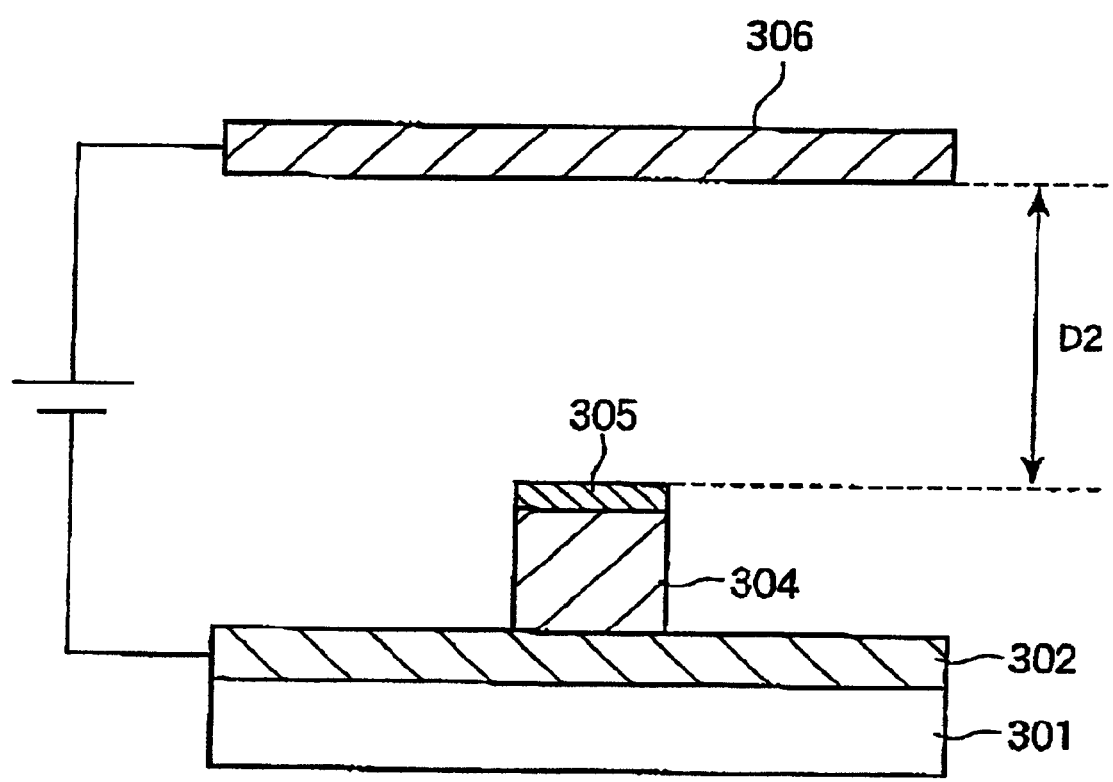
FIG. 16 is a schematic cross-sectional view of a diode type electron-emitting device among FE type electron-emitting devices.
Figure 17:
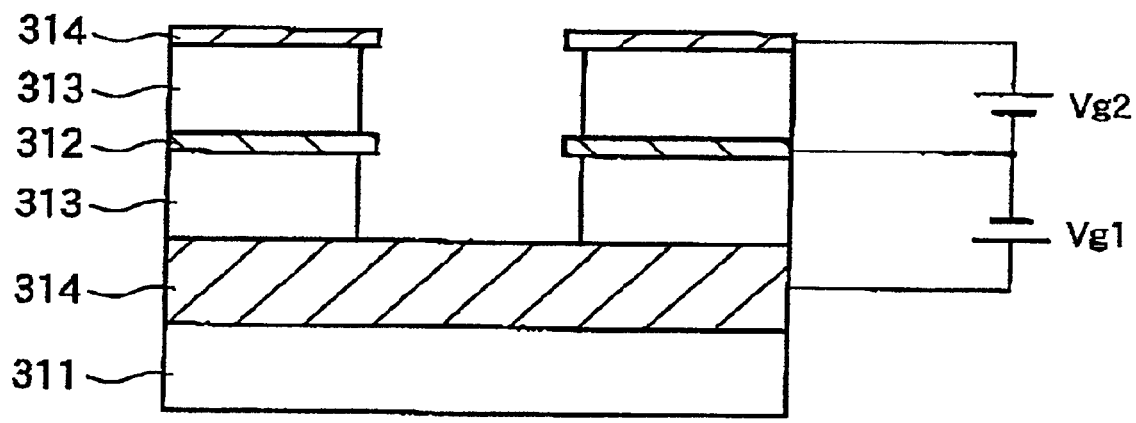
FIG. 17 is a schematic cross-sectional view of an edge emitter type electron-emitting device among the FE type electron-emitting devices.

FIG. 14 is a schematic cross-sectional view of the electron-emitting device of this embodiment, while FIG. 15 is a schematic plain view of the same.

The following description centers on the characteristic points of this embodiment and therefore the same points as in the aforementioned embodiments are omitted.

The electron-emitting device of this embodiment is manufactured in the same manner as in the first embodiment.

As to the size of the electron-emitting device, the thickness thereof is set at the same value as in the first embodiment, although the hole diameter W2 shown in FIG. 15 is set at 84 µm.

When the electron-emitting device of this embodiment is driven under a condition where Va=10 kV, Vb=0V, and D1=2 mm, electrons emitted from the electron-emitting film 15 gather at almost the center of the hole shown in FIG. 15 and the intensity of light emitted from the phosphor is remarkably increased.

<Eighth Embodiment>

In this embodiment, the electron-emitting device having the construction shown in FIG. 18A is manufactured. The following description concerns a method of manufacturing the electron-emitting device of this embodiment.

(Step 1)

The substrate 11 is prepared by sufficiently cleaning a quartz glass. Following this, with a sputtering method, the first electrode 12 that is an Ti layer having a thickness of 5 nm (not shown), the insulating layer 13 that is an $SiO_2$ layer, and the second electrode 14 that is a Ti layer are stacked on the substrate 11 in this order.

Next, a resist pattern is formed using a positive photoresist (AZ1500 manufactured by Clariant) in a photolithography step.

Then, dry etching is performed from above of the patterned photoresist functioning as a mask to obtain the shapes of the first electrode 12, the insulating layer 13, and the second electrode 14 shown in FIG. 18A.

(Step 2)

Following this, a mask is formed to cover only a surface area of the second electrode in which the electron-emitting film 15 shown in FIG. 18A is not to be arranged.

(Step 3)

Next, a complex solution where isopropyl alcohol or the like is added to a Pd complex is applied to the surface area of the second electrode that is not covered with the mask.

After the application, heat treatment is performed in the air at 300° C. to convert the applied complex solution into a palladium oxide film.

(Step 4)

The substrate is then heated to 200° C., the air is exhausted, and heat treatment is performed in a 2% hydrogen stream diluted by nitrogen. As a result of this step, a large number of Pd particles are formed on the surface of the second electrode 14.

(Step 5)

Following this, heat treatment is performed at 500° C. for ten minutes in a 0.1% ethylene stream diluted by nitrogen to obtain the electron-emitting film 15. Then, the mask on the second electrode 14 is removed to obtain the electron-emitting device of this embodiment.

By observing the electron-emitting film 15 manufactured in this example using a scanning electron microscope, it is found that a large number of fibrous carbons.

This device is placed in an vacuum apparatus and the air inside the apparatus is sufficiently reduced to a degree of vacuum of $1 \times 10^{-5}$ Pa. Then, an anode voltage Va=10 KV is applied to the anode electrode 16 whose distance H to the device is 2 mm, and a pulse voltage of 15V is applied to the device as the driving voltage Vb. An electron emission current Ie is measured under this condition.

The Ie characteristic of the electron-emitting device of this example is such that Ie is dramatically increased from around half of the applied voltage (Vb) and, when Vb=15V, an electron emission current Ie of around 1 $\mu$A is measured.

The beam obtained in this example has a shape close to a rectangle that is long in the Y direction and is short in the X direction. Also, a superfine beam is obtained and the current Ie stays stable for a long time period.

By observing the fibrous carbons of this electron-emitting device using a transmission electron microscope, it is found that the so-called graphite nanofiber structure is obtained where graphenes are laminated in the axial direction of each fiber as shown in the right area of FIG. 20.

<Ninth Embodiment>

An electron source and an image-forming apparatus are produced using the electron-emitting devices of the first-eighth examples.

The electron-emitting devices are arranged in a form of a 10 by 10 MTX. Wiring are connected in the manner shown in FIG. 6, where the X-directional wiring are connected to the second electrode layer and the Y-directional wiring are connected to the first electrode layer. The horizontal intervals and the vertical intervals between the devices are 150 $\mu$m and 300 $\mu$m, respectively. A phosphor is arranged over the devices so that a distance of 2 mm is maintained therebetween. A voltage of 10 kV is applied to the phosphor. In this manner, an image-forming apparatus and an electron source are achieved which are capable of performing matrix driving and high definition operations, having uniform electron-emitting characteristics, and remaining stable for a long time period.

As described above, the present invention realizes an electron-emitting device that has a uniform electron-emitting characteristic, emits an electron beam whose diameter is small, has a simple construction, and is easy to be manufactured.

Also, the first voltage applying means is used to apply a certain voltage to an anode. As a result, if the electron-emitting device of the present invention is applied to an image-forming apparatus, an emission current is obtained through which has a phosphor emit light having sufficient brightness.

Further, the electron-emitting device of the present invention realizes a high-performance electron source and image-forming apparatus.

What is claimed is:

1. An electron-emitting apparatus comprising:
   an electron-emitting device including a first electrode, a second electrode that is provided so as to be insulated from the first electrode, and an electron-emitting film attached to the second electrode and insulated from the first electrode; and
   an anode provided at a predetermined distance from the electron-emitting film,
   wherein the first electrode, the second electrode, and the electron-emitting film oppose the anode,
   such that a distance between the anode and the electron-emitting film is longer than a distance between the anode and the second electrode, and
   a distance between the anode and the first electrode is longer than the distance between the anode and the electron-emitting film.

2. An electron-emitting apparatus according to claim 1, further comprising a first voltage applying means for applying, to the anode, a potential that is higher than potentials applied to the first electrode and the second electrode.

3. An electron-emitting apparatus according to claim 1, further comprising a second voltage applying means for applying a voltage between the first electrode and the second electrode.

4. An electron-emitting apparatus according to claim 3, wherein when electrons are emitted from the electron-emitting film, a potential applied to the first electrode is set so as to be at least equal to a potential applied to the second electrode.

5. An electron-emitting apparatus according to claim 3, wherein when no electrons are emitted from the electron-emitting film, a potential applied to the first electrode is set so as to be below a potential applied to the second electrode.

6. An electron-emitting apparatus according to claim 1, wherein the electron-emitting film includes carbon or a carbon compound.

7. An electron-emitting apparatus according to claim 6, wherein said carbon or said carbon compound includes at least one of diamond like carbon, graphite, diamond, a carbon nanotube, a graphite nanofiber, and fullerene.

8. An electron source that is formed by arranging a plurality of electron-emitting apparatuses of any one of claims 1 to 7 and emits electrons from at least one of the plurality of electron-emitting apparatuses according to an input signal.

9. An image-forming apparatus comprising:
the electron source of claim 8; and
an image forming member on which an image is formed by irradiation with electrons emitted from the electron source.

10. An electron-emitting device comprising:
a first electrode arranged on a surface of a substrate;
an insulating layer arranged on the first electrode;
a second electrode arranged on the insulating layer; and
a plurality of carbon fibers arranged on the second electrode,
wherein each carbon fiber has a plurality of graphenes which are stacked so as not to be parallel to an axis direction of the fiber, and
wherein the second electrode has two side surfaces that oppose each other in a direction substantially parallel to the surface of the substrate, and the plurality of carbon fibers are arranged so as to be shifted close to one of the two side surfaces.

11. An electron-emitting device according to claim 10,
wherein electrons are emitted from the carbon fibers when a potential applied to the first electrode is set so as to be at least equal to a potential applied to the second electrode.

12. An electron-emitting device according to claim 10,
wherein no electrons are emitted from the carbon fibers when a potential applied to the first electrode is set so as to be below a potential applied to the second electrode.

13. An electron source in which are arranged a plurality of electron-emitting devices, each being an electron-emitting device according to any one of claims 10, 11 and 12.

14. An image-forming apparatus comprising:
the electron source of claim 13, and
a phosphor.

15. An electron-emitting apparatus comprising:
a first electrode arranged on a surface of a substrate;
an insulating layer arranged on the first electrode;
a second electrode arranged on the insulating layer; and
a plurality of carbon fibers arranged on the second electrode;
an anode disposed at a distance from the plurality of carbon fibers, the first electrode, the insulating layer, the second electrode and the substrate;
a first power source for applying a necessary electric field, to cause an electron emission from the plurality of carbon fibers, at least between the anode and the second electrode; and
a second power source for applying a necessary electric field, to stop the electron emission from the plurality of carbon fibers, between the first electrode and the second electrode.

16. An electron-emitting apparatus according to claim 15, wherein
said first power source forms an electric field necessary for causing the electron emission from the plurality of carbon fibers, by applying to said anode a voltage higher than a voltage applied to said second electrode and said first electrode, and
said second power source forms an electric field necessary for stopping the electron emission from the plurality of carbon fibers, by applying to said first electrode a voltage lower than a voltage applied to said second electrode.

17. An electron-emitting apparatus according to claim 15, wherein each carbon fiber is a carbon nanotube.

18. An electron-emitting apparatus according to claim 15, wherein each carbon fiber comprises a plurality of graphenes which are stacked in a direction that is not perpendicular to an axis direction of said carbon fiber.

19. An electron source that is formed by arranging a plurality of electron-emitting aparatuses, each being an electron-emitting apparatus according to any one of claims 15 to 18, and which emits electrons from at least one of the plurality of electron-emitting apparatuses according to an input signal.

20. An image forming apparatus comprising:
the electron source of claim 19; and
an image forming member on which an image is formed by irradiation with electrons emitted from the electron source.

21. An electron-emitting apparatus comprising:
a substrate having a first electrode and a second electrode;
an anode disposed at a distance from the substrate;
an electron-emitting film, facing the anode, attached to a surface of the second electrode;
a first power source for applying a necessary electric field, to cause an electron emission from the electron-emitting film, at least between the anode and the second electrode; and
a second power source for applying a necessary electric field, to stop the electron emission from the electron-emitting film, between the first electrode and the second electrode,
wherein a distance between the first electrode and the anode is larger than a distance between the second electrode and the anode.

22. An electron-emitting apparatus according to claim 21, wherein
said first power source forms an electric field necessary for causing the electron emission from the electron-emitting film, by applying to said anode a voltage higher than a voltage applied to said second electrode and said first electrode, and
said second power source forms an electric field necessary for stopping the electron emission from the electron-emitting film, by applying to said first electrode a voltage lower than a voltage applied to said second electrode.

23. An electron-emitting apparatus according to claim 21, wherein
said electron-emitting film comprises a plurality of carbon fibers.

24. An electron-emitting apparatus according to claim 23, wherein each carbon fiber includes a plurality of graphenes which are stacked in a direction that is not perpendicular to an axis direction of the carbon fiber.

25. An image forming apparatus comprising:
a plurality of the electron-emitting apparatuses each being an electron-emitting apparatus according to any one of claims 21 to 24, and wherein each emits electrons from at least one of the plurality of electron-emitting apparatuses according to an input signal; and
phosphors which emit light by irradiation with electrons emitted from the electron-emitting film.

26. An electron-emitting device comprising:
a first electrode arranged on a surface of a substrate;
an insulating layer arranged on the first electrode;

a second electrode arranged on the insulating layer; and a plurality of carbon fibers arranged on the second electrode, wherein each carbon fiber comprises a plurality of graphenes stacked in a direction that is not perpendicular to an axis direction of the fiber, and wherein the plurality of carbon fibers are arranged on the second electrode so that the plurality of carbon fibers are close to a part of an outer periphery of the second electrode.

27. An electron-emitting device according to claim 26, wherein electrons are emitted from the carbon fibers when a potential applied to the first electrode is set so as to be at least equal to a potential applied to the second electrode.

28. An electron-emitting device according to claim 26, wherein no electrons are emitted from the carbon fibers when a potential applied to the first electrode is set so as to be below a potential applied to the second electrode.

29. An electron source, comprising:

the substrate; and a plurality of electron-emitting devices arranged on the substrate, each electron-emitting device being an electron-emitting device according to any one of claims 26, 27, and 28.

30. An image-forming apparatus comprising:

the electron source of claim 29; and a phosphor.

* * * * *

UNITED STATES PATENT AND TRADEMARK OFFICE
CERTIFICATE OF CORRECTION

PATENT NO. : 6,853,126 B2
DATED : February 8, 2005
INVENTOR(S) : Kazushi Nomura

It is certified that error appears in the above-identified patent and that said Letters Patent is hereby corrected as shown below:

Title page,
Item [56], References Cited, FOREIGN PATENT DOCUMENTS,
after "H02G/5/06", "EP 1 122 344 A3 8/2001" should be deleted;
after "JP 7-6714 10/1995", "JP 8-115652 5/1996" should be deleted; and
after "JP 5-198253 8/1993", "JP 5-211029 8/1993" should be deleted.
OTHER PUBLICATIONS, "A.M. Rao et al.," reference, after "A.M. Rao et al.,",
"of" should be deleted; and "Letter," should read -- Letters, --.

Column 1,
Line 29, "an" should read -- a --; and
Line 43, "are small" should read -- is small --.

Column 5,
Line 66, "OV That" should read -- OV. That --.

Column 6,
Line 9, "prohibited in" should read -- prohibited. In --.

Column 7,
Line 55, "$Al_2$, $O_3$, Caf" should read -- $Al_2O_3$, CaF --.

Column 8,
Line 39, "comprises" should read -- comprising --;
Line 40, "emit" should read -- emits --;
Line 55, "(-1000×)" should read -- (~1000×) --;
Line 57, "(-3000×)" should read -- (~3000×) --; and
Line 60, "(-1000000×)" should read -- (~1000000×) --.

Column 9,
Lines 6 and 13, "graphens" should read -- graphenes --; and
Line 22, "orbital" should read -- orbitals --.

Column 10,
Line 7, "steam" should read -- vapor --;
Line 58, "wiring" should read -- wirings --; and
Line 66, "have" should read -- has --.

Column 11,
Line 16, "are" should read -- is --.

UNITED STATES PATENT AND TRADEMARK OFFICE
CERTIFICATE OF CORRECTION

PATENT NO. : 6,853,126 B2
DATED : February 8, 2005
INVENTOR(S) : Kazushi Nomura

It is certified that error appears in the above-identified patent and that said Letters Patent is hereby corrected as shown below:

Column 12,
Line 28, "cross sectional" should read -- cross-sectional --; and
Line 34, "Firsts" should read -- First, --.

Column 13,
Line 9, "condition" should read -- conditions --; and
Lines 38 and 44, "like" should read -- as --.

Column 15,
Lines 16 and 22, "like" should read -- as --.

Column 16,
Line 64, "an" should read -- a --.

Column 17,
Line 33, "carbons." should read -- carbons exist. --;
Line 36, "Va = 10 KV" should read -- Va = 10 kV --;
Line 59, "Wiring" should read -- Wirings --; and
Lines 60 and 61, "are" should read -- is --.

Column 18,
Line 14, "through which has a phosphor" should read -- which causes a phosphor to --.

Signed and Sealed this

Sixth Day of September, 2005

JON W. DUDAS
*Director of the United States Patent and Trademark Office*